United States Patent [19]

Yanai et al.

[11] Patent Number: 5,775,276
[45] Date of Patent: Jul. 7, 1998

[54] VALVE DRIVING APPARATUS USING AN ELECTROMAGNETIC COIL TO MOVE A VALVE BODY WITH REDUCED NOISE

[75] Inventors: Akihiro Yanai, Toyota; Iwao Maeda, Mishima; Takashi Izuo; Tatuo Iida, both of Toyota, all of Japan

[73] Assignee: Toyota Jidosha Kabushiki Kaisha, Aichi-Ken, Japan

[21] Appl. No.: 600,663

[22] Filed: Feb. 13, 1996

[30] Foreign Application Priority Data

Feb. 15, 1995 [JP] Japan ................................ 7-026947
Aug. 22, 1995 [JP] Japan ................................ 7-213281

[51] Int. Cl.$^6$ ........................................................ F01L 9/04
[52] U.S. Cl. .......................................... 123/90.11; 361/154
[58] Field of Search .................................. 123/490, 90.11; 361/154, 159, 170, 199, 210

[56] References Cited

U.S. PATENT DOCUMENTS

| | | | |
|---|---|---|---|
| 4,706,619 | 11/1987 | Buchl | 123/90.11 |
| 4,885,658 | 12/1989 | Buchl | 361/154 |
| 4,908,731 | 3/1990 | Richeson, Jr. | 361/159 |
| 4,978,865 | 12/1990 | Hartmann et al. | 307/140 |
| 5,574,617 | 11/1996 | Shimanuki et al. | 361/154 |

FOREIGN PATENT DOCUMENTS

| | | |
|---|---|---|
| A-0 136 968 | 4/1985 | European Pat. Off. . |
| A-0 298 737 | 1/1989 | European Pat. Off. . |
| A-0 408 963 | 1/1991 | European Pat. Off. . |
| A-0 452 562 | 10/1991 | European Pat. Off. . |
| C-33 07 683 | 7/1984 | Germany . |
| C-35 43 017 | 2/1987 | Germany . |
| 60-175805 | 11/1985 | Japan . |
| 63-277810 | 11/1988 | Japan . |
| 1-227808 | 9/1989 | Japan . |
| 2-181006 | 7/1990 | Japan . |

OTHER PUBLICATIONS

Patent Abstracts of Japan, vol. 009, No. 039 (E–297), 19 Feb. 1985.

Research Disclosure, No. 352, 1 Aug. 1993, p. 518 XP000395246 "Electromagnetic Engine Valve Actuator with Low Seating Velocity".

Patent Abstracts of Japan, vol. 010, No. 246 (M–5100, 23 Aug. 1986 and JP–A–61 076713 (Mazda Motor Corp), 19 Apr. 1986.

Primary Examiner—Willis R. Wolfe
Assistant Examiner—Hieu T. Vo
Attorney, Agent, or Firm—Kenyon & Kenyon

[57] ABSTRACT

An electromagnetic force generated in a valve driving apparatus is rapidly decreased when a valve body moves to a position close to the end of its stroke so that a shock generated when the valve body reaches the end of the stroke is reduced. The valve body is movable between opposite ends of its stroke so as to open and close a valve provided in an internal combustion engine. An electromagnetic coil generates an electromagnetic force exerted on the valve body. A current supplied to the electromagnetic coil is controlled in accordance with an operational condition of the internal combustion engine. The current flowing in the electromagnetic coil is rapidly decreased when the valve body approaches the end of its stroke.

15 Claims, 16 Drawing Sheets

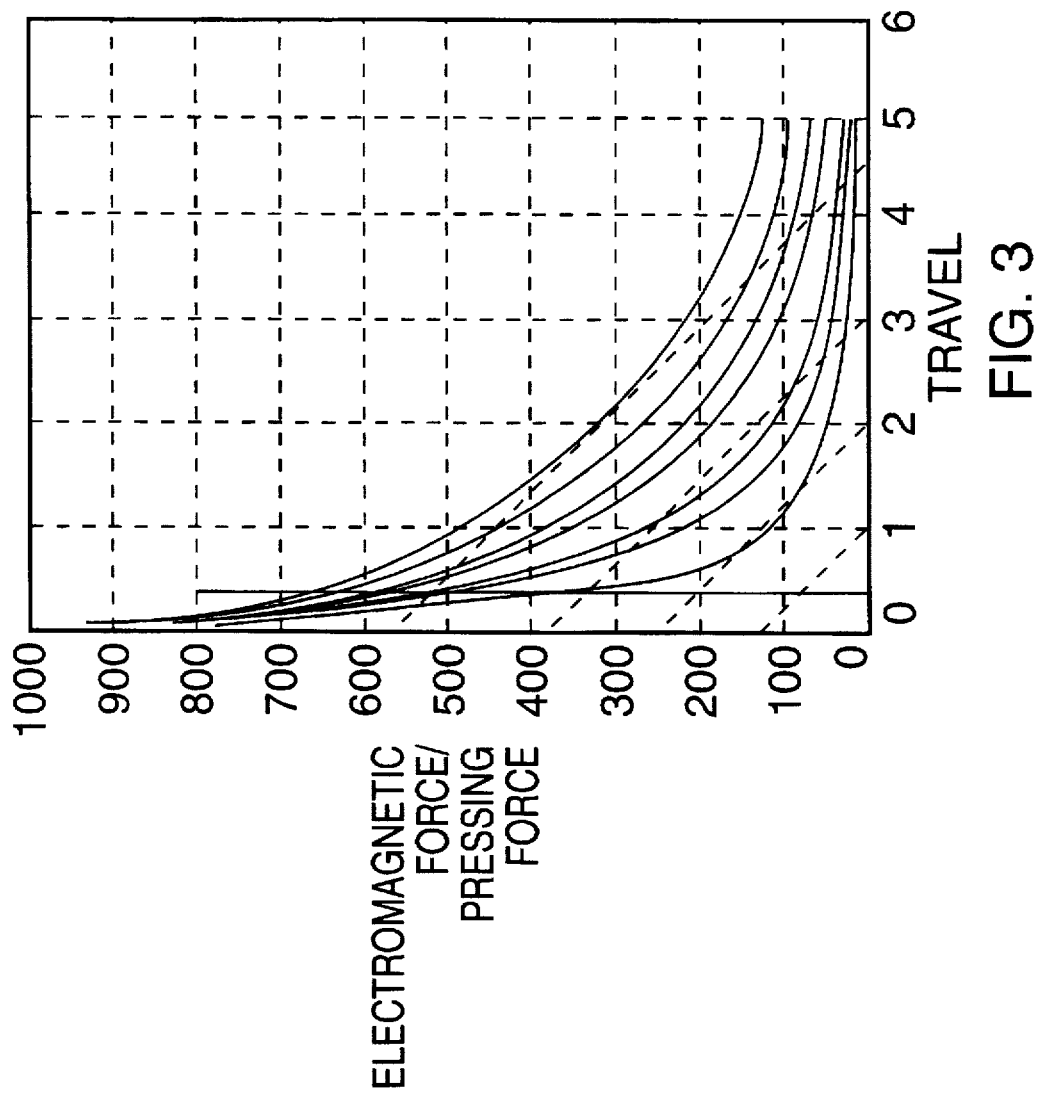

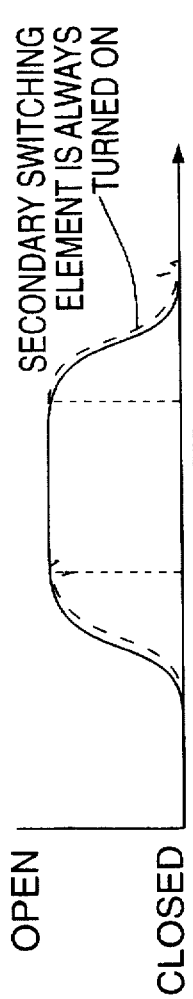
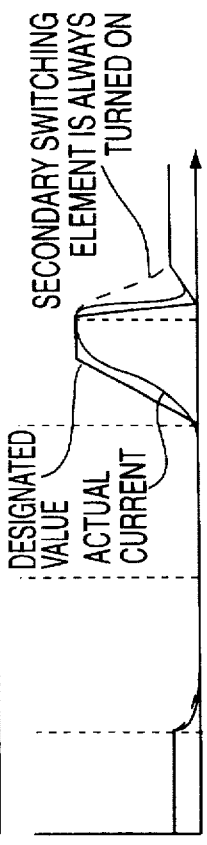
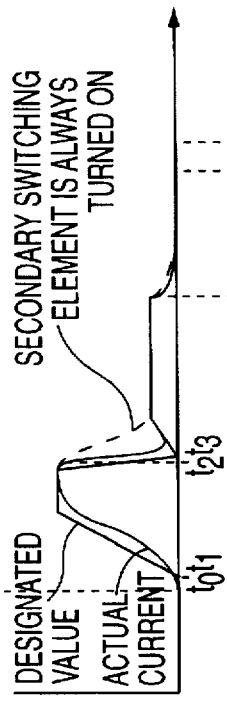
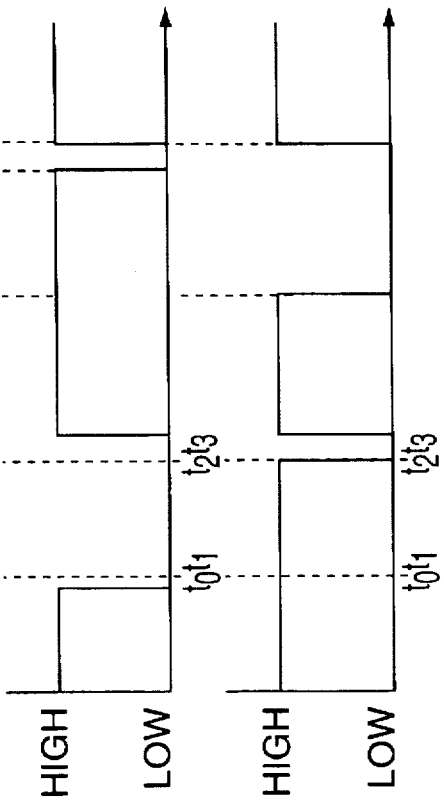
VALVE LIFT
FIG. 4A
FIRST ELECTROMAGNETIC COIL
(DESIGNATED VALUE & ACTUAL CURRENT)
FIG. 4B
SECOND ELECTROMAGNETIC COIL
(DESIGNATED VALUE & ACTUAL CURRENT)
FIG. 4C
CONTROL SIGNAL FOR FIRST ELECTROMAGNETIC COIL
FIG. 4D
CONTROL SIGNAL FOR SECOND ELECTROMAGNETIC COIL
FIG. 4E

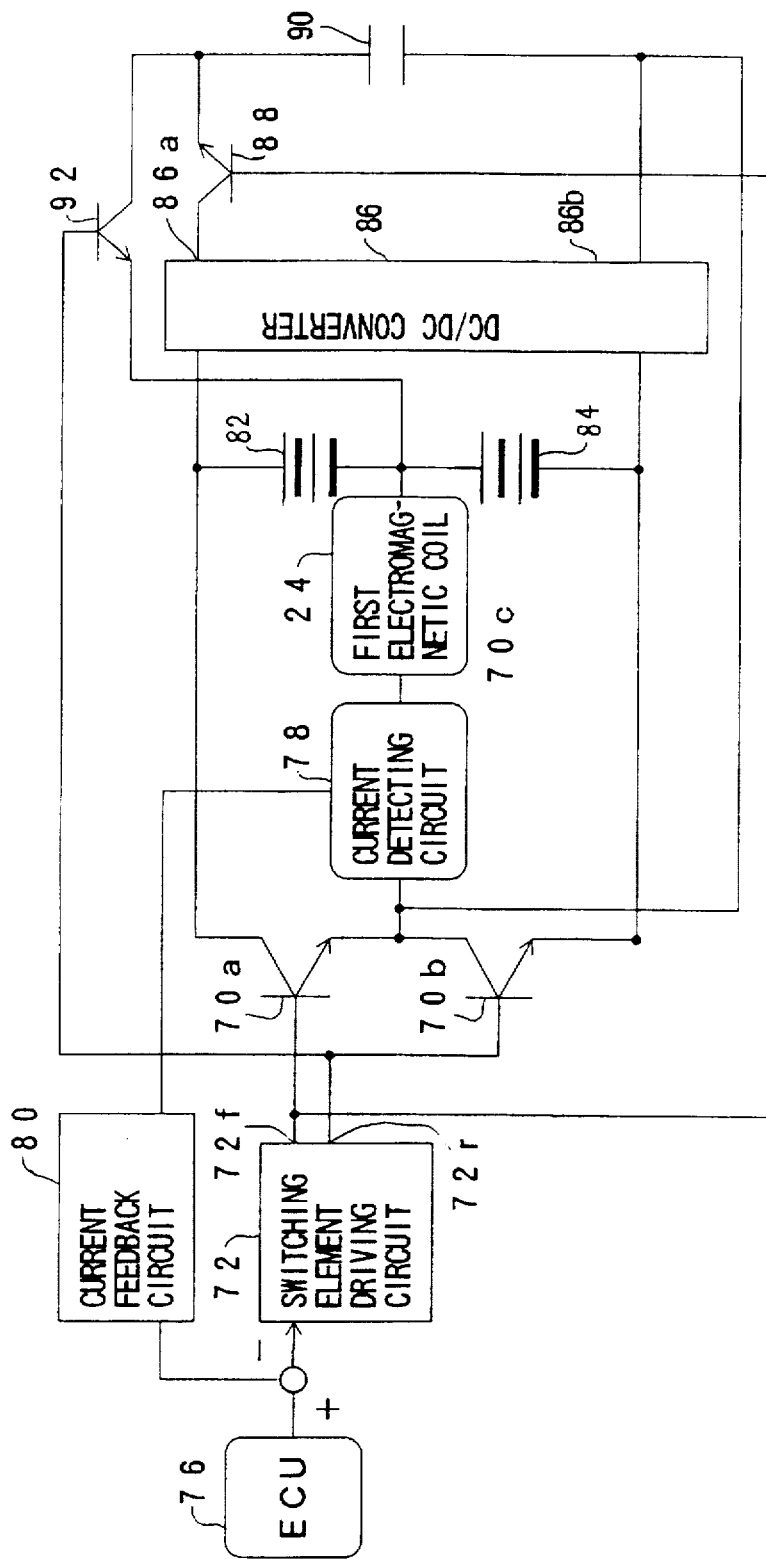

VALVE DRIVING APPARATUS USING AN ELECTROMAGNETIC COIL TO MOVE A VALVE BODY WITH REDUCED NOISE

BACKGROUND OF THE INVENTION

1. Field of the Invention

The present invention relates to a valve driving apparatus of an internal combustion engine and, more particularly to a valve driving apparatus for driving an intake or an exhaust valve by using an electromagnetic force generated when a predetermined electric power is supplied to an electromagnetic coil.

2. Description of the Related Art

A valve driving apparatus is known in the art which drives an intake valve or an exhaust valve of an internal combustion engine by using an electromagnetic force generated by an electromagnetic coil. Japanese Laid-Open Patent Application No.2-181006 discloses an example of such a valve driving apparatus. Such a valve driving apparatus eliminates a valve driving mechanism such as a camming mechanism. Additionally, since an ideal timing of opening and closing of the valves can be easily provided based on an operational condition of the internal combustion engine, output characteristics and specific fuel consumption of the internal combustion engine can be improved.

The above-mentioned conventional valve driving apparatus generates an electromagnetic force by supplying a predetermined current to an electromagnetic coil. A valve body is moved toward an open position or a closed position by the electromagnetic force. If the current is supplied for the purpose of merely moving the valve body, the valve body may be strongly moved toward the open position or the closed position. This may result in generation of noise and reduces service life of the valve body. However, in the conventional valve driving apparatus, the current supplied to the electromagnetic coil is controlled without any consideration with respect to a seating characteristics of the valve body. Accordingly, the conventional valve driving apparatus does not always provide a desired characteristics with respect to a low noise operation and a long service life of the valve body.

SUMMARY OF THE INVENTION

It is a general object of the present invention to provide an improved and useful valve driving apparatus in which the above-mentioned problems are eliminated.

A more specific object of the present invention is to provide a valve driving apparatus in which an electromagnetic force generated therein is rapidly decreased when a valve body moves to a position close to either end of its stroke so that shock, generated when the valve body reaches the end of stroke, is reduced.

In order to achieve the above-mentioned object, there is provided according to the present invention a valve driving apparatus for driving a valve provided in an internal combustion engine, the valve having a valve body movable between a first position and a second position so as to open and close the valve, the valve driving apparatus comprising:

an electromagnetic coil generating an electromagnetic force exerted on the valve body;

current controlling means for controlling a current supplied to the electromagnetic coil in accordance with an operational condition of the internal combustion engine; and current decreasing means for decreasing the current when the valve body approaches one of the first position and the second position.

According to the present invention, the valve body does not strongly collide with a valve seat at the end of its stroke. Thus, an improvement in low-noise operation of the engine is achieved. Additionally, the service life of the valve body is improved.

In one embodiment of the present invention, the current decreasing means comprises:

a flywheel circuit returning a current flowing in the electromagnetic coil; and a variable resistor circuit increasing a resistance of the flywheel circuit when the valve body approaches at least one of the first position and the second position.

In this embodiment, a current generated in the electromagnetic coil due to a reverse electromotive force flows to the flywheel circuit. The current flowing in the flywheel circuit is rapidly decreased since the current is converted to heat by the increased resistance of the flywheel circuit. Thus, the current flowing in the electromagnetic coil when the valve body approaches the end of stroke is rapidly decreased.

The valve driving apparatus according to the present invention may comprise current detecting means for detecting the current supplied to the electromagnetic coil so as to generate a current detection signal. The variable resistor circuit varies the resistance of the flywheel circuit in accordance with the difference between a value of a current designating signal supplied by an engine control unit and a value of a current detection signal supplied by the current control means. The current designating signal is supplied by an engine control unit for controlling the current supplied to the electromagnetic coil.

When the valve body approaches the end of the stroke, the value of the current designating signal is decreased. At this time, an actual current flowing in the electromagnetic coil differs from the current designated by the current designating signal. However, in this embodiment, the current supplied to the electromagnetic coil is rapidly decreased since the resistance of the flywheel circuit is increased in accordance with a difference between the current designated by the current designating signal and the actual current flowing in the electromagnetic coil.

Additionally, in another embodiment of the present invention, the current controlling means comprises first voltage supplying means for supplying a first voltage to the electromagnetic coil so that the first current flows in the electromagnetic coil in a first direction. The current decreasing means comprises second voltage supplying means for supplying a second voltage to the electromagnetic coil when the valve body approaches one of a first position and a second position, the second voltage being supplied so that a second current flows in the electromagnetic coil in a direction opposite to the first direction. Accordingly, the current flowing in the electromagnetic coil when the second voltage is supplied is rapidly decreased since the second voltage is reversed from the first voltage.

Additionally, the second voltage supplying means may comprise a capacitor and voltage increasing means for increasing a third voltage supplied to the capacitor. The capacitor is connected to the electromagnetic coil so that the second voltage is temporarily increased by a discharge of the capacitor when the second voltage is supplied to the electromagnetic coil. The voltage across the terminals of the capacitor is higher than the second voltage since the third voltage supplied to charge the capacitor is increased by the voltage increasing means.

Other objects, features and advantages of the present invention will become more apparent from the following detailed description when read in conjunction with the accompanying drawings.

BRIEF DESCRIPTION OF THE DRAWINGS

FIG. 3 is a graph showing a characteristic of the electromagnetic actuator shown in FIG. 2;

FIG. 4 is a time chart for explaining an operation of the drive circuit shown in FIG. 1;

FIG. 16 is a circuit diagram of an eleventh embodiment of a valve drive apparatus according to the present invention.

DETAILED DESCRIPTION OF THE PREFERRED EMBODIMENTS

Figure 1:
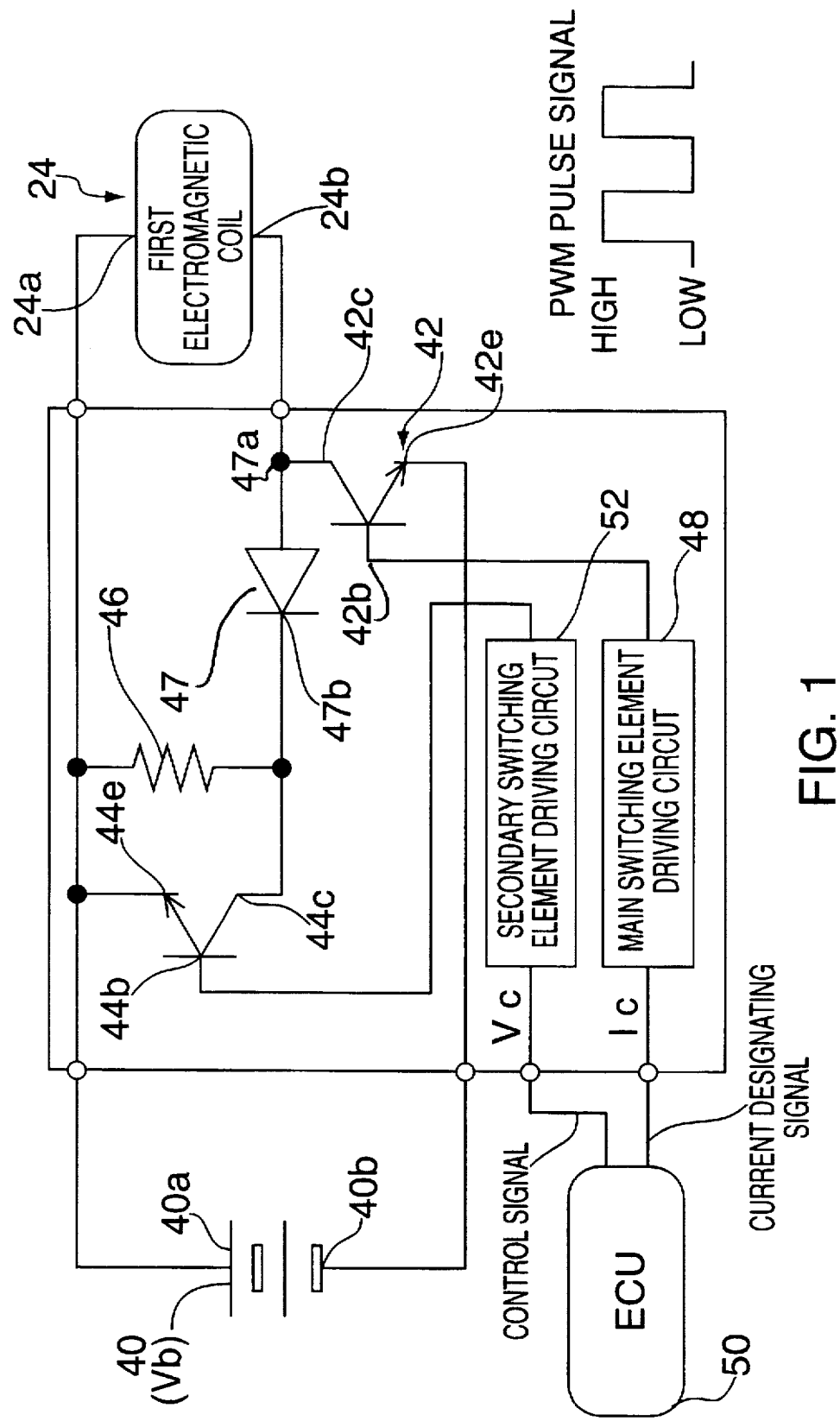
FIG. 1 is a circuit diagram of a first embodiment of a valve drive apparatus according to the present invention.
Figure 2:
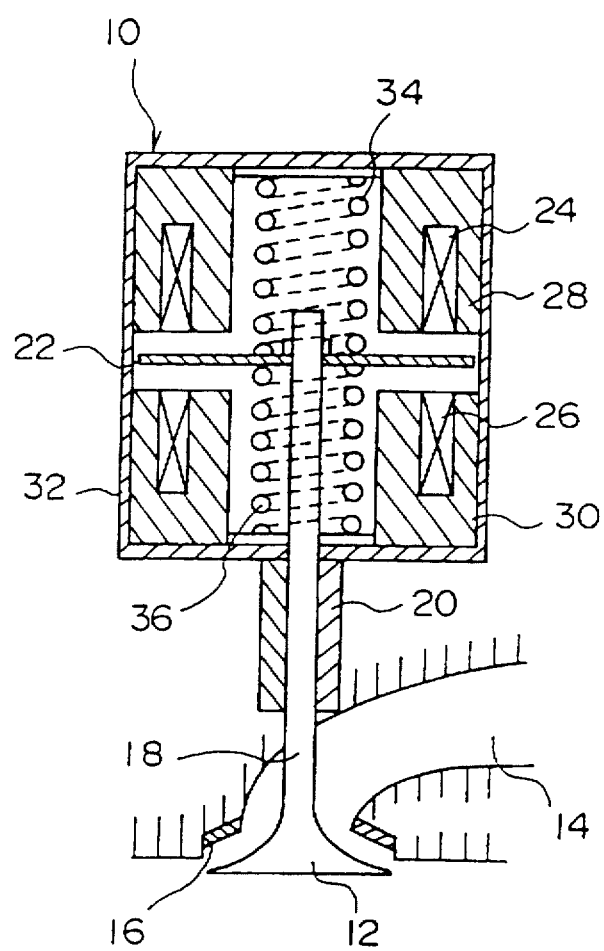
FIG. 2 is a cross-sectional view of an electromagnetic actuator operated by the valve drive apparatus according to the present invention.

A description will now be given, with reference to FIG. 1, of a first embodiment of the present invention. FIG. 1 is a drive circuit of a valve driving apparatus according to the first embodiment of the present invention. FIG. 2 is a cross-sectional view of an electromagnetic actuator 10 driven by the drive circuit shown in FIG. 1.

The electromagnetic actuator 10 shown in FIG. 2 drives a valve body 12. The valve body 12 reciprocally moves to open or close an intake or an exhaust port 14 (hereinafter simply referred to as a port 14) by seating on a valve seat 16 or separating from the valve seat 16.

A valve stem 18 extends from the valve body 12. The valve stem 18 is slidably supported by a valve guide 20 in the axial direction. A plunger 22 is fixed on an end of the valve stem 18. The plunger is made of a soft magnetic material and has a disk-like shape. A first electromagnetic coil 24 is arranged above the plunger 22 with a predetermined distance apart from the plunger 22. The first electromagnetic coil 24 is supported by a first core 28. A second electromagnetic coil 26 is arranged under the plunger 22 with a predetermined distance apart from the plunger 22. The second electromagnetic coil 26 is supported by a second core 30. The first and second cores 28 and 30 are made of a soft magnetic material. The first and second core 28 and 30 are arranged in a housing 32 made of a non-magnetic material. Each of first and second core 28, 30 has an annular shape having a center opening thereof which accommodates springs 34 and 36, respectively.

In the structure shown in FIG. 2, the plunger 22 is elastically supported by the springs 34 and 36 from both sides so that the plunger 22 can elastically move between the electromagnetic coils 24 and 26. When no force is applied to the plunger 22, the plunger 22 is positioned between the first core 28 and the second core 30 since the pressing forces generated by the springs 34 and 36 are balanced. This balanced position of the plunger 22 will be hereinafter referred to as a neutral position. When the plunger 22 is at the neutral position, the valve body 12 is positioned at an intermediated position between the open position and the closed position. The intermediate position of the valve body 12 will be hereinafter referred to as a half-open position.

In the above structured electromagnetic actuator 10, a magnetic circuit is formed by the first core 28, the plunger 22 and an air gap formed between the first core 28 and the plunger 22, the magnetic circuit surrounding the first electromagnetic coil 24. Accordingly, when a current is supplied to the first electromagnetic coil 24, an electromagnetic force is generated in the plunger 22 so that the plunger 22 is moved toward the first core 28. Additionally, a magnetic circuit is formed by the second core 30, the plunger 22 and an air gap formed between the second core 30 and the plunger 22, the magnetic circuit surrounding the second electromagnetic coil 26. Accordingly, when a current is supplied to the second electromagnetic coil 26, an electromagnetic force is generated in the plunger 22 so that the plunger 22 is moved toward the second core 30.

Accordingly, if a current is supplied to the first electromagnetic coil 24 and the second electromagnetic coil 26, alternately, the plunger 22 can be reciprocally moved between the first core 28 and the second core 30. That is, the valve body 12 can be moved between the open position and the closed position.

FIG. 3 is a graph showing a relationship between a displacement of the valve body 12 and the electromagnetic force generated in the plunger 22 and a relationship between the displacement of the valve body 12 and a pressing force exerted on the plunger 22 by the springs 34 and 36. In FIG. 3, each of a plurality of oblique dotted lines represents a relationship between a displacement of the valve body 12 from the closed position to the half-open position and a pressing force exerted on the plunger 22 by the springs 34 and 36 with respect to various strokes. Zero position in the horizontal axis corresponds to the closed position of the valve body 12. As shown in FIG. 3, the pressing force exerted on the plunger by the springs 34 and 36 is in reverse proportion to the travel of the valve body 12.

In FIG. 3, each of a plurality of solid line curves represents a relationship between travel of the valve body 12 and an electromagnetic force generated in the plunger 22 when a constant current is supplied to the first electromagnetic coil 24 with respect to various values of the constant current. As shown in the figure, the electromagnetic force generated in the plunger 22 sharply increases as the valve body 12 approaches the end of its stroke, that is, the closed position.

Accordingly, in the electromagnetic actuator 10, if an intensity of the current supplied to the first electromagnetic coil 24 is constant, an increase in the electromagnetic force generated in the plunger 22 is much greater than an increase in the pressing force exerted on the plunger 22 as the valve body 12 approaches the closed position. In this condition, the valve body 12 will collide with the valve seat 16 at a high speed. This may generate noise due to the collision and reduces service life of the valve body 12 as previously mentioned.

Although FIG. 3 shows the characteristic of the actuator 10 when the valve body 12 moves between the half-open position and the closed position, a similar characteristics may be observed when the valve body 12 moves between the half-open position and the open position.

On the other hand, if the current supplied to the first electromagnetic coil 24 and the second magnetic coil 26 is sharply decreased when the plunger 22 moves to a position close to the closed position or the open position, the valve body can be gently moved to the closed position or the open position. However, since the first electromagnetic coil 24 and the second electromagnetic coil 26 have an inductance, if the current flowing to the coils is simply interrupted by a switching operation, an undesired electromotive force is generated in the coils. The electromotive force will generate a high-voltage which may require the driving circuit to have a high dielectric withstanding property.

Additionally, as shown in FIG. 3, the electromagnetic force exerted on the plunger 22 becomes smaller as the current supplied to the first electromagnetic coil 24 is decreased. However, when the valve body 12 is extremely close to the closed position, a large electromagnetic force is exerted on the plunger even if the current supplied to the first electromagnetic coil is small. Accordingly, in order to effectively decrease the electromagnetic force, the current supplied to the electromagnetic coil 24 must be rapidly and greatly decreased before the valve body 12 reaches the end of its stroke.

The driving circuit shown in FIG. 1 is provided so as to rapidly and greatly decrease the current supplied to the first electromagnetic coil 24 and the second electromagnetic coil 26. The current generated due to the electromotive force in the coils is consumed by a resistor. As a result, the valve body 12 is gently seated on the valve seat 16. Thus, generation of noise is prevented and a long service life of the valve body 12 can be obtained.

The driving circuit shown in FIG. 1 is provided for the first electromagnetic coil 24. A similar driving circuit may be provided for the second electromagnetic coil 26. A description will be given of only the driving circuit for the first electromagnetic circuit 24, for the sake of convenience.

In FIG. 1, an inflow terminal 24a of the first electromagnetic coil 24 is connected to a terminal 40a of a power source 40. An outflow terminal 24b of the first electromagnetic coil 24 is connected to a collector terminal 42c of a main switching element 42. The main switching element 42 comprises an NPN-type transistor. An emitter terminal 42e of the main switching element 42 is connected to a ground terminal of the power source 40. Accordingly, when the main switching element 42 is turned on, a power source voltage Vb is applied between the inflow terminal 24a and the outflow terminal 24b of the first electromagnetic coil 24. When the main switching element 42 is turned off, the power source voltage Vb is not supplied to the first electromagnetic coil 24.

Additionally, the electromagnetic coil 24 is connected to a flywheel circuit which comprises a secondary switching element 44, a resistor 46 and a flywheel diode 47. The secondary switching element 44 comprises an NPN-type transistor. The resistor 46 is connected in parallel to the secondary switching element 44. The outflow terminal 24b is connected to an anode terminal 47a of the flywheel diode 47. A cathode terminal 47b of the flywheel diode 47 is connected to a collector terminal 44c of the secondary switching element 44 and an end of the resistor 46. The inflow terminal 24a of the first electromagnetic coil 24 is connected to an emitter terminal 44e of the secondary switching element 44 and the other end of the resistor 46.

Accordingly, if an electromotive force is generated in the first electromagnetic coil 24 when the current flowing in the first electromagnetic coil 24 is decreased, the voltage at the outflow terminal 24b becomes higher than the voltage at the inflow terminal 24a. In this case, a current flows in through the flywheel circuit in a direction from the outflow terminal 24b to the inflow terminal 24a.

A base terminal of the main switching element 42 is connected to an output terminal of a main switching element driving circuit 48. Additionally, an input terminal of the main switching element driving circuit 48 is connected to an engine control unit (ECU) 50. The engine control unit 50 calculates a value of the current to be supplied to the first electromagnetic coil 24. The engine control unit 50 supplies a current designating signal Ic, which corresponds to the calculated value of the current to be supplied to the first electromagnetic coil 24, via the main switching element driving circuit 48.

The main switching element driving circuit 48 comprises a triangular waveform generating circuit and a comparing circuit. The triangular waveform generating circuit generates a triangular wave having a predetermined frequency. The comparing circuit compares the current designating signal Ic with the triangular waveform. The main switching element driving circuit 48 outputs a PWM pulse signal having a duty ratio corresponding to a value of the current designating signal Ic. That is, the PWM pulse signal having a duty ratio corresponding to the value of the current designating signal output from the engine control unit 50 is supplied to the base terminal 42b of the main switching element 42. Accordingly, the turn on period of the main switching element 42 is increased as the value of the current designating signal Ic is increased.

When the main switching element 42 is turned on, the power source voltage Vb is supplied between the inflow terminal 24a and the outflow terminal 24b of the first electromagnetic coil 24. In this case, a current determined by an impedance of the first electromagnetic coil 24 and the power source voltage Vb flows through the first electromagnetic coil 24. On the other hand, when the main switching element 42 is turned off, an electromotive force is generated in the first electromagnetic coil 24 so that a current flows in a direction opposite to the current which has been flowing in the first electromagnetic coil 24. Thus, a current flows through the first electromagnetic coil 24, a value of the current being determined by a magnitude of the electromotive force and the resistance of the flywheel circuit.

In this case, an average value of the current flowing through the first electromagnetic coil 24 is influenced by the resistance of the flywheel circuit in addition to the duty ratio of the PWM pulse signal. That is, as the duty ratio of the PWM pulse signal becomes greater or the resistance of the fly wheel circuit becomes smaller, a larger current flows through the first electromagnetic coil 24. Accordingly, it is preferable to set a smaller resistance of the flywheel circuit to drive the flywheel circuit 10 so as to exert an electromagnetic force on the plunger 22.

On the other hand, if the resistance of the flywheel circuit is increased, the current flowing in the first electromagnetic coil 24 immediately after the main switching element 42 is turned off is rapidly decreased. Accordingly, it is preferable to set a larger resistance of the flywheel circuit to drive the flywheel circuit 10 so as to rapidly decrease the electromagnetic force generated by the first electromagnetic coil 24.

In the driving circuit shown in FIG. 1, an output terminal of a secondary switching element driving circuit 52 is connected to the base terminal 44b of the secondary switching element 44. Additionally, an input terminal of the secondary switching element driving circuit 52 is connected to the engine control unit 50 so that a secondary switching element control signal Vc is input to the input terminal of the secondary switching element driving circuit 52. The secondary switching element control signal Vc falls at a predetermined crank angle of the associated engine at which crank angle the valve body 12 is close to the closed position. The secondary switching element driving circuit 52 binarize the signal Vc and outputs to the secondary switching element 44. Accordingly, a high-level output is supplied to the base terminal 44b of the secondary switching element 44 until the valve body 12 moves to the position close to the closed position. Thereafter, a low-level output is supplied to the base terminal 44b of the secondary switching element 44.

Accordingly, in the driving circuit of the present embodiment, the resistance of the flywheel circuit is maintained to be a small value until the valve body 12 moves close to the closed position, since the secondary switching element 44 is turned on. On the other hand, after the valve body has moved close to the closed position, the resistance of the flywheel circuit is increased since the secondary switching element is turned off. This satisfies the above-mentioned preferable condition of the resistance of the flywheel circuit.

A description will now be given, with reference to FIG. 4, of an operation of the valve driving apparatus according to the present embodiment. It should be noted that characteristic curves indicated by dotted lines in FIG. 4-(A), 4-(B) an 4-(C) are obtained when the secondary switching element 44 is turned on, that is, when the resistance of the flywheel circuit is maintained to be a small value. FIG. 4-(A) indicates a lift (hereinafter referred to as a valve lift) of the valve body 12. FIG. 4(B) indicates the current designating signal for the first electromagnetic coil 24 and an actual current flowing in the first electromagnetic coil 24. FIG. 4-(C) indicates the current designating signal for the second electromagnetic coil 26 and an actual current flowing in the first electromagnetic coil 26. FIG. 4-(D) indicates the control signal for the secondary switching element 44 connected to the first electromagnetic coil 24. FIG. 4-(E) indicates the control signal for the secondary switching element 44 connected to the second electromagnetic coil 26.

As shown in FIG. 4-(A), the valve body is maintained at the closed position before time t0. Since a small electromagnetic force is enough to maintain the valve 12 at the closed position, a relatively low-level current designating signal is supplied to the first electromagnetic coil 24 as shown in FIG. 4-(B). In this state, an actual current is substantially equal to the current designating signal. As mentioned above, the resistance of the flywheel circuit is preferably set to be as small as possible. Thus, the high-level signal is supplied to the secondary switching element 44 of the first electromagnetic coil 24 as shown in FIG. 4-(D). Accordingly, in the present embodiment, the valve body 12 is maintain at the closed position with a small power consumption.

It should be noted that the high-level control signal is supplied also to the secondary switching element 44 connected to the second electromagnetic coil 26 at time t0 as shown in FIG. 4-(E) so as to prepare for the activation of the second electromagnetic coil 26.

At time t0, the crank angle of the associated engine reaches the crank angle at which the opening operation of the valve member 12 should be started. Thus, as shown in FIG. 4-(B), the current designating signal is changed to zero so as to release the valve body 12 from the closed position. At the same time, as shown in FIG. 4(D), the control signal supplied to the secondary switching element 44 connected to the first electromagnetic coil 24 is switched from the high-level to the low-level.

Accordingly, as shown in FIG. 4(B), the actual current flowing in the first electromagnetic coil 24 is decreased faster than the actual current when the secondary switching element 44 is always turned on (as indicated by the dotted curved line in the figure). As a result, the electromagnetic force which moves the plunger 22 toward the closed position is rapidly decreased after time t0. Thus, as shown in FIG. 4-(A), the valve body 12 starts to move toward the open position with a rapid response after time t0. As mentioned above, when the valve body 12 initiates the movement, the electromagnetic force in the opposite direction is rapidly decreased. Thus, the valve body 12 can be moved by a smaller force as compared to the state in which the electromagnetic force in the opposite direction is not decreased. This results in less power consumption when the movement of the valve body is initiated.

As shown in FIG. 4-(C), after time t0, the current designating signal to the second electromagnetic coil 26 is raised at a predetermined rate at time t1. After that, until time t3, the current designating signal having a predetermined profile is supplied to the second electromagnetic coil 26. A current is not supplied to the second electromagnetic coil 26 during the period from t0 to t1 since an electromagnetic force sufficient to attract the plunger 22 toward the open position is not effectively generated during that period. The profile of the current designating signal during the period from t1 to t2 is determined by considering a fluctuation of the actual current with respect to the current designating signal and a characteristic of the movement of the valve body 12 corresponding to the actual current. Accordingly, when the current designating signal for the second electromagnetic signal 26 is controlled as mentioned above, the valve body 12 is smoothly moved from the closed position to a position close to the open position as shown in FIG. 4-(A).

When the valve body 12 has moved close to the open position at time t2, the current designating signal is rapidly decreased as shown in FIG. (C). At the same time, the control signal supplied to the secondary switching element 44 connected to the second electromagnetic coil 26 is switched from the high-level to the low-level. Thus, as shown in FIG. 4-(C), the actual current flowing in the second electromagnetic coil 26 is decreased faster than the actual current when the secondary switching element 44 is always turned on. As a result, the electromagnetic force which moves the plunger 22 toward the open position is rapidly decreased after time t2. Thus, as shown in FIG. 4-(A), the valve body 12 gently moves to the open position.

After that, as shown in FIG. 4-(C), the current designating signal to the second electromagnetic coil 26 is gradually increased to the level sufficient for maintaining the valve body at the open position. At the same time, as shown in FIG. 4-(E), the current designating signal to the secondary switching element 44 connected to the second electromagnetic coil 26 is switched from the low-level to the high-level.

Thus, the valve body 12, which has been gently moved to the open position is maintained at the open position as shown in FIG. 4-(A).

It should be noted that the control signal supplied to the secondary switching element 44 connected to the first electromagnetic coil 24 is also switched from the low-level to the high-level at time t3 as shown in FIG. 4-(D) so as to prepare for the activation of the first electromagnetic coil 24.

Thereafter, in the same manner, the current designating signals and the control signals are appropriately controlled. Thus, the valve body 12 can be positively and smoothly moved from the open position to the closed position.

According to the present embodiment, the valve body 12 does not strongly collide with the valve seat 16. Additionally, the plunger 22 does not strongly collide with the first core 28 and the second core 30. Thus, an improvement in low-noise operation of the engine is achieved. Additionally, the service life of the valve body 12 and the plunger 22 is also improved.

If an attempt is made to simply prevent a strong collision of the valve body 12, a dumping mechanism may be provided to absorb the energy of movement of the valve body 12 at positions close to the closed position or the open position. However, in such a construction, a part of the energy applied to the valve body 12 is consumed by the damper mechanism. This is not in accordance with energy conservation, and construction of the valve driving apparatus may become complex.

In the valve driving apparatus according to the present embodiment, most of the energy applied to the valve body 12 by the first and second electromagnetic coils 24 and 26 is used for moving and maintaining the valve body 12. Thus, the valve driving apparatus according to the present embodiment achieves an ideal energy conservation while achieving the above-mentioned improvements.

Figure 5:
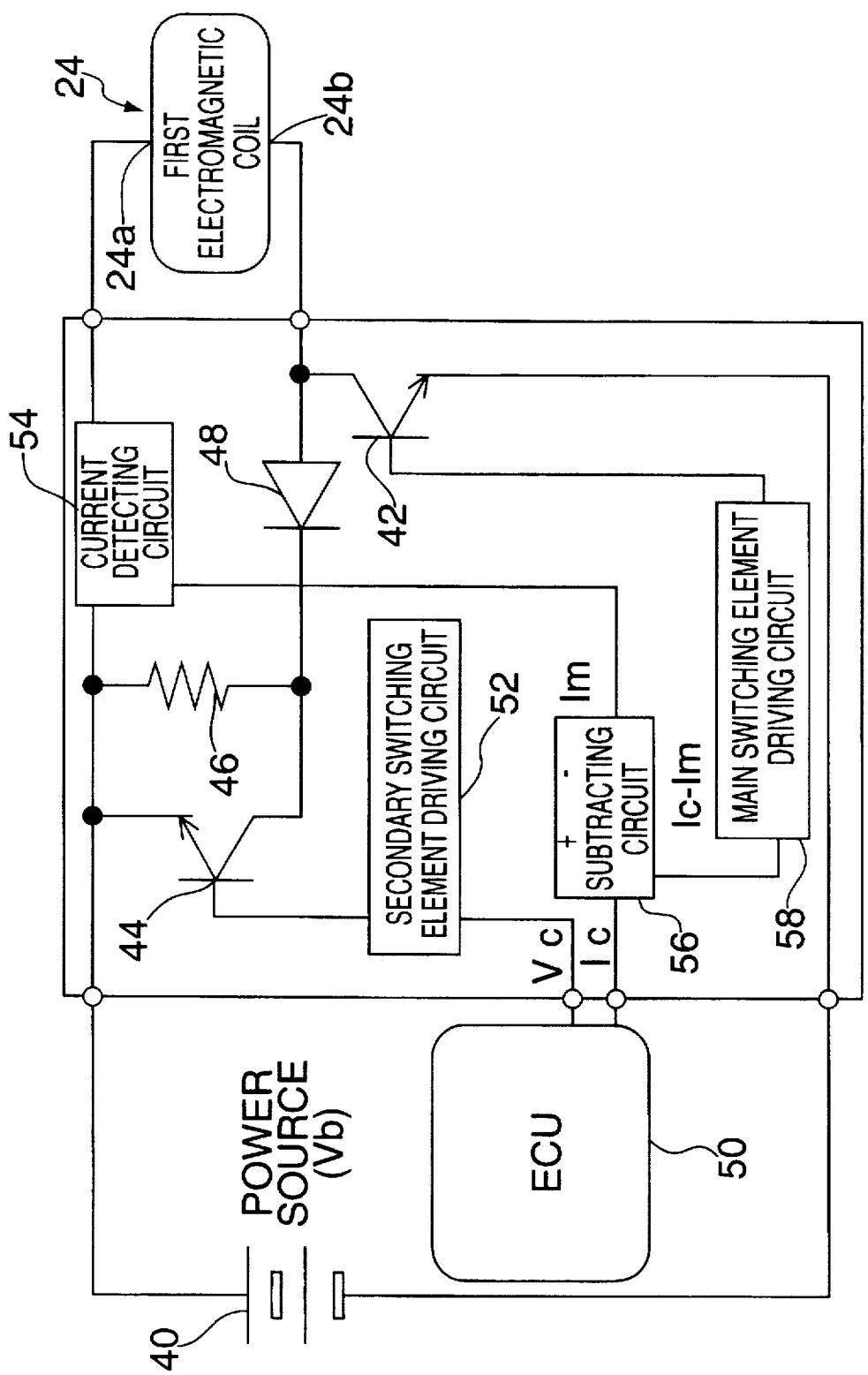
FIG. 5 is a circuit diagram of a second embodiment of a valve drive apparatus according to the present invention.

FIG. 5 is a circuit diagram of a driving circuit according to a second embodiment of the present invention. In FIG. 5, parts that are the same as the parts shown in FIG. 1 are given the same reference numerals, and descriptions thereof will be omitted.

The driving circuit shown in FIG. 5 comprises a current detecting circuit 54 which detects an actual current Im flowing through the first electromagnetic coil 24. A subtracting circuit calculates a difference (Ic–Im) between the actual current Im and the current designating signal Ic. The difference (Ic–Im) is supplied to a main switching element driving circuit 58. The main switching element driving circuit 58 outputs to the main switching element 42 the PWM pulse signal having a duty ratio controlled by the difference (Ic–Im).

According to the second embodiment, the duty ratio of the PWM pulse signal output from the main switching element driving circuit 58 is controlled so that the actual current Im becomes equal to the current designating signal Ic. In this case, the actual current Im flowing through the first electromagnetic coil 24 is adjusted by a feedback control. Thus, a stable current can be obtained in a wide operational range against fluctuation in the power source voltage Vb and the characteristics of the circuit.

Figure 6:
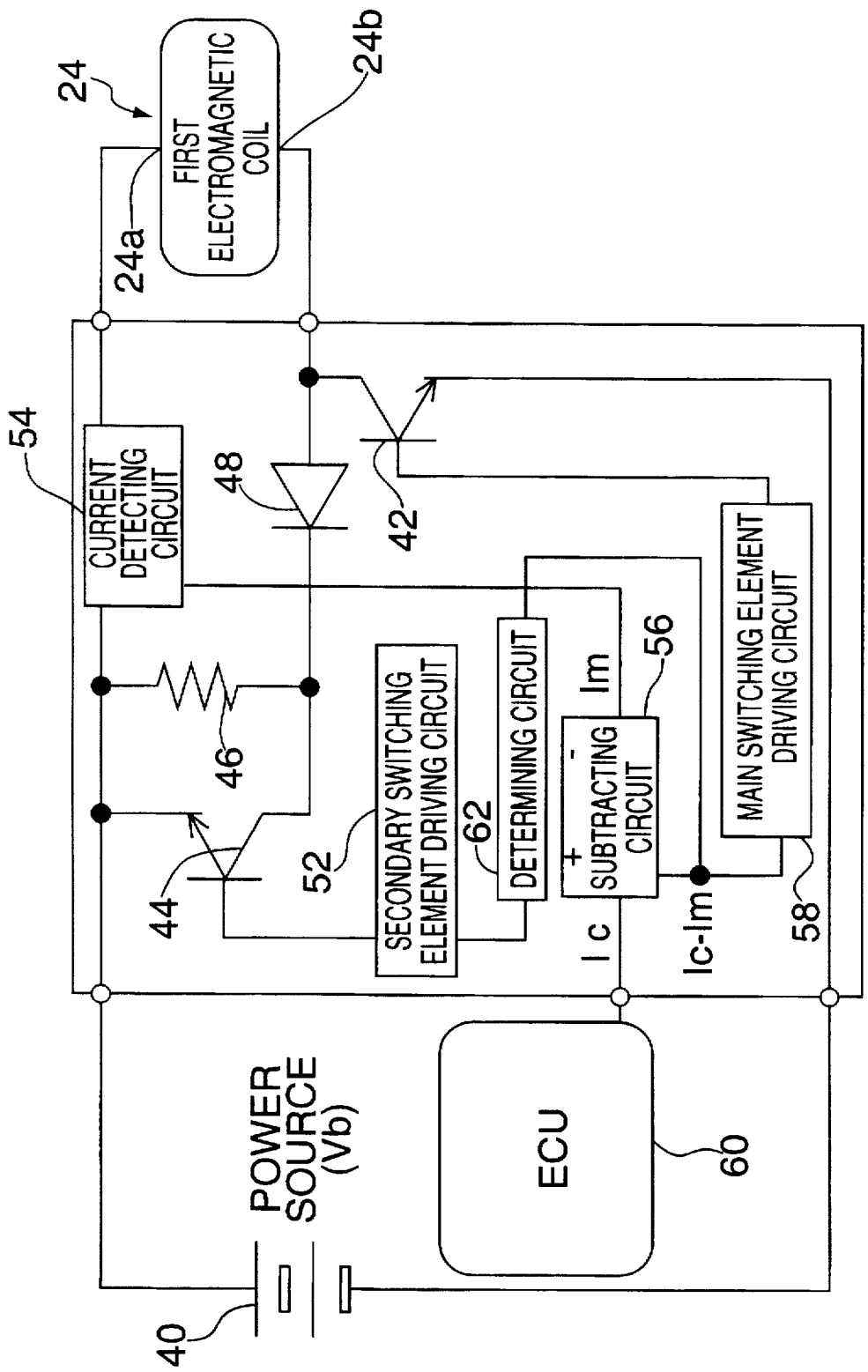
FIG. 6 is a circuit diagram of a third embodiment of a valve drive apparatus according to the present invention.

FIG. 6 is a circuit diagram of a driving circuit according to a third embodiment of the present invention. In FIG. 6, parts that are the same as the parts shown in FIGS. 1 and 5 are given the same reference numerals, and descriptions thereof will be omitted.

In the driving circuit shown in FIG. 6, an engine control unit 60 supplies the current designating signal Ic to the subtracting circuit 56. The subtracting circuit 56 calculated the difference (Ic–Im) between the current designating signal and the actual current Im detected by the current detecting circuit 54. The calculated value (Ic–Im) is supplied to the main switching element driving circuit 58 and a determining circuit 62.

Figure 7:
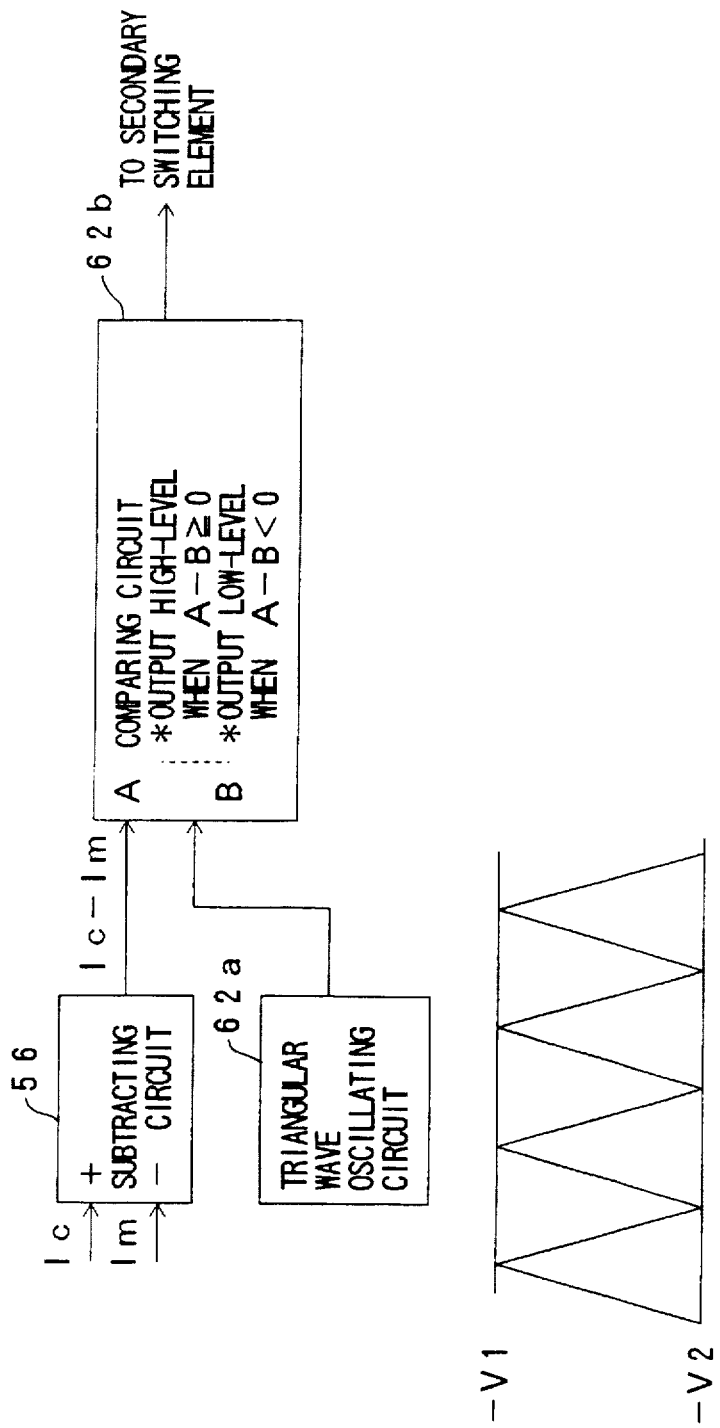
FIG. 7 is a block diagram of a determining circuit used in the third embodiment.

The determining circuit 62 comprises, as shown in FIG. 7, a triangular wave oscillating circuit 62a and a comparing circuit 62b. The triangular wave oscillating circuit 62a generates triangular wave signal having a minimum value of $-V2$ and a maximum value of $-V1$. The comparing circuit 62b compares the value (Ic–Im) (hereinafter referred to as a value A) supplied by the subtracting circuit 56 with a value B of the triangular wave signal. If $A-B \geq 0$, the determining circuit 62 supplies the high-level control signal Vc to the secondary switching element driving circuit 52. If $A-B<0$, the determining circuit supplies the low-level control signal Vc to the secondary switching element driving circuit 52.

Accordingly, as the value A (Ic–Im) is increased, that is, as the actual current Im is smaller than the current designating signal Ic, the PWM pulse signal having a greater duty ratio is supplied to the secondary switching element 44 from the secondary switching element driving circuit 52. On the contrary, as the value A (Ic–Im) is decreased, that is, as the actual current Im is greater than the current designating signal Ic, the PWM pulse signal having a smaller duty ratio is supplied to the secondary switching element 44 from the secondary switching element driving circuit 52. In particular, if $Ic-Im \geq -V1$, the PWM pulse signal having a duty ratio of 100% is supplied to the secondary switching element 44. On the contrary, if $IC-Im<-V2$ the PWM pulse signal having a duty ratio of 0% is supplied to the secondary switching element 44. That is, the secondary switching element 44 is subjected to a duty ratio control so that a turn-on period of the secondary switching element 44 per unit period of time becomes longer as the actual current Im must be increased to equalize the actual current Im to the current designating signal Ic. The turn-on period of the secondary switching element 44 per unit period of time becomes shorter as the actual current Im must be decreased. In this case, the resistance of the flywheel circuit becomes smaller as the actual current Im must be increased. The resistance becomes greater as the actual current Im must be decreased.

As shown in FIG. 4-(B) and 4-(C), the current designating signal Ic rises at time t1 in FIG. 4-(C), at which movement of the valve body 12 from the open position or the closed position must be initiated. The current designating signal rapidly falls when the valve body 12 moves close to the other end (time t2 in FIG.4-(c)).

In this condition, the actual current Im flowing in the first electromagnetic coil 24 and the second electromagnetic coil 26 is delayed from the current designating signal due to the impedance of the first electromagnetic coil 24 and the second electromagnetic coil 26. Accordingly, the current designating signal Ic is greater than the actual current Im when the current designating signal Ic is increasing, and the current designating signal Ic is less than the actual current Im when the current designating signal Ic is decreasing.

Accordingly, in the above-mentioned condition, the value (Ic–Im) is always equal to or greater than $-V1$ ($Ic-Im \geq -V1$) when the valve body 12 is moving but not yet reached a position close to either one of the ends of its stroke. The value (Ic–Im) is less than $-V2$ immediately after the valve body 12 reached the position close to either one of the ends of its stoke. Thereafter, a condition $-V2 \leq Ic-Im<-V1$ is temporary established during a process in which the valve body 12 is set to a stable state.

In the present embodiment, when the condition Ic−Im≧−V1 is established, the secondary switching element 44 is maintained to be turned on since the secondary switching element 44 is driven by the PWM pulse signal having the duty ratio of 100%. When the condition Ic−Im<−V2 is established, the secondary switching element 44 is maintained to be turned off since the secondary switching element 44 is driven by the PWM pulse signal having the duty ratio of 0%. Additionally, when the condition −V2≦Ic−Im<−V1 is established, the secondary switching element 44 is driven by the PWM pulse signal having an appropriate duty ratio corresponding to the value (Ic−Im).

Accordingly, the resistance of the flywheel circuit provided in the present embodiment is maintained to be at the minimum value after the valve body 12 is started to move and until the valve body 12 is moved close to the other end of its stroke. The resistance becomes the maximum value immediately after the valve body 12 has reached a position close to the other end of the stroke. Thereafter, the resistance is gradually decreased to the minimum value as the valve body 12 further approaches the end of the stroke.

In the above-mentioned condition, the resistance of the flywheel circuit is maintained to be the minimum value when the valve body 12 is moving toward an end of the stroke and the when the valve body 12 is maintained at either one of the ends of the stroke. Thus, a desired current can be efficiently supplied to the first electromagnetic coil 24 or the second electromagnetic coil 26. Additionally, the resistance of the flywheel circuit is increased to the maximum value when the valve body 12 has reached the position close to one of the ends of the stroke. Thus, the current flowing through the first electromagnetic coil 24 or the second electromagnetic coil 26 is rapidly decreased. This prevents a strong collision of the valve body 12 with the valve seat 16 or the strong collision of the plunger 22 with the first core 28 or the second core 30. In the present embodiment, the control signal Vc is not needed to be supplied from the engine control unit 60 to the secondary switching element driving circuit 52.

Additionally, in the present embodiment, since the resistance of the flywheel circuit is changed, a fine adjustment of the current flowing to the first electromagnetic coil 24 or the second electromagnetic coil 26 can be achieved. This results in a fine control of a characteristic of movement of the valve body 12.

In the driving circuit shown in FIG. 6, the driving pattern of the secondary switching element 44 is determined so as to correspond to the characteristic of the electromagnetic actuator 10. However, the driving pattern is not limited to the above-mentioned pattern. That is, in the driving circuit according to the present embodiment, the current supplied to the first electromagnetic coil 24 or the second electromagnetic coil 26 can be changed without changing a value of a resistor which may be provided in the flywheel circuit. This means that the driving circuit of the present embodiment can be used with various actuators requiring different current characteristics without a change in hardware construction.

It should be noted that, in the driving circuits shown in FIGS.1, 5 and 6, the main switching element 42 and the main switching element driving circuit 48 or 58 together constitute current controlling means. The resistor 46, the secondary switching element 44 and the secondary switching element driving circuit 52 constitute a variable resistor circuit.

In the above-mentioned embodiments, although a transistor is used as the main switching element 42, another switching element such as a high speed relay switch may be used. Additionally, although the current supplied to the first electromagnetic coil 24 or the second electromagnetic coil 26 is adjusted by controlling the main switching element 42 by a PWM control method, the current may be adjusted by using another control method such as a method using a linear region of the main switching element 42.

Figure 8:
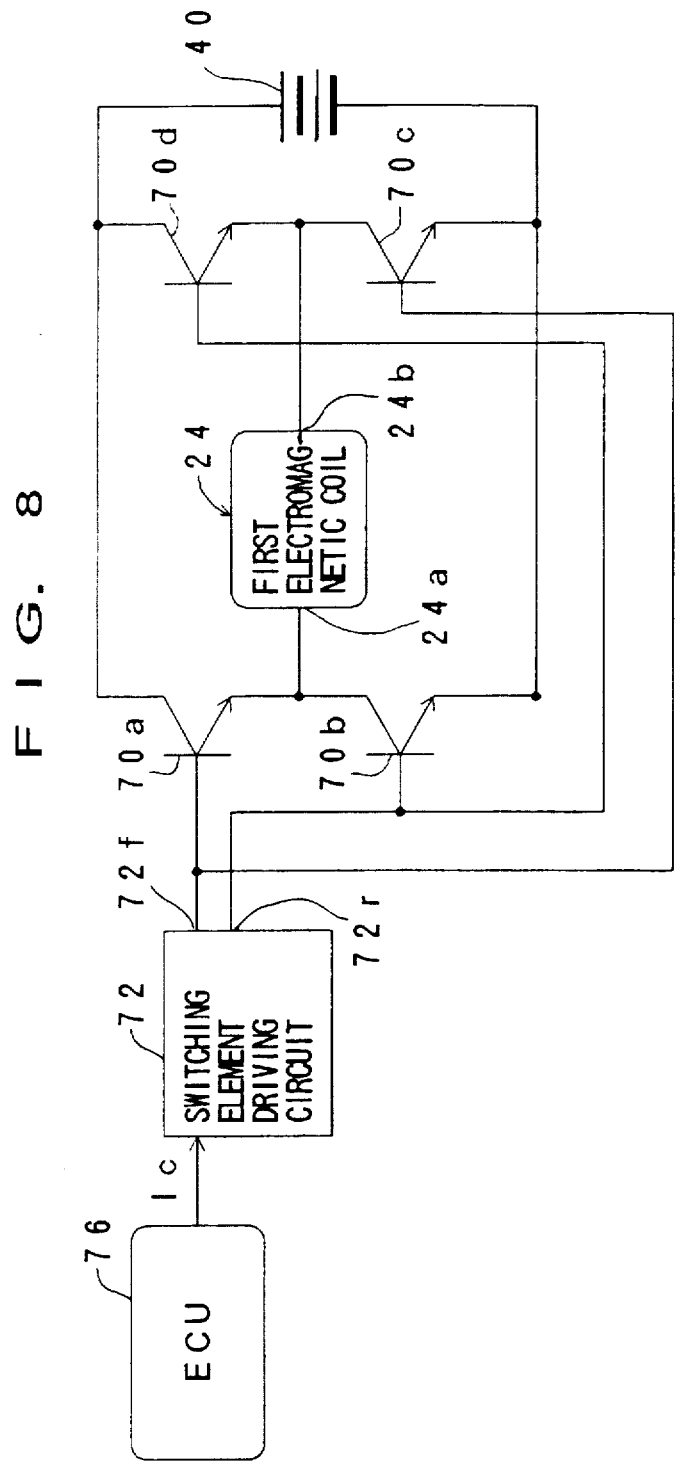
FIG. 8 is a circuit diagram of a fourth embodiment of a valve drive apparatus according to the present invention.

FIG. 8 is a circuit diagram of a driving circuit according to a fourth embodiment of the present invention. It should be noted that the circuit diagram shown in FIG. 8 indicates only a part related to the first electromagnetic coil 24 for the sake of simplification. In order to drive the electromagnetic actuator 10, a similar circuit must be provided for the second electromagnetic coil 26. In FIG. 8, parts that are the same as the parts shown in FIG. 1 are given the same reference numerals, and descriptions thereof will be omitted.

In the driving circuit shown in FIG. 8, the inflow terminal 24a of the first electromagnetic coil 24 is connected to an emitter terminal of a forward direction switching element 70a and a collector terminal of a backward direction switching element 70b. Each of the switching elements 70a and 70b comprises an NPN-type transistor. The outflow terminal 24b of the first electromagnetic coil 24 is connected to a collector terminal of a forward direction switching element 70c and an emitter terminal of a backward direction switching element 70d. Each of the switching elements 70c and 70d comprises an NPN-type transistor.

The collector terminal of the switching element 70a and the collector terminal of the switching element 70d are connected to the positive terminal of the power source 40. The emitter terminal of the switching element 70b and the emitter terminal of the switching element 70c are connected to the negative terminal of the power source 40. A base terminal of each of the switching elements 70a and 70c is connected to a frontward direction output terminal 72f of a switching element driving circuit 72. A base terminal of each of the switching elements 70b and 70d is connected to a backward direction output terminal 72r of the switching element driving circuit 72.

An input terminal of the switching element driving circuit 72 is connected to an engine control unit ECU 76. The engine control unit ECU 76 calculates a value of current to be supplied to the first electromagnetic coil 24 based on a relationship with the crank angle of the associated engine. The current designating signal Ic corresponding to the calculated current value is supplied to the switching element driving circuit 72.

The switching element driving circuit 72 comprises a triangular wave oscillating circuit and a comparing circuit. The triangular wave oscillating circuit generates a triangular wave signal having a predetermined period. The comparing circuit compares a value of the current designating signal with a value of the triangular wave signal. The switching element driving circuit 72 generates a PWM pulse signal having a duty ratio adjusted by the value of the current designating signal Ic. The switching element driving circuit 72 outputs the PWM pulse signal from the forward direction output terminal 72f when the current designating signal Ic supplied by the engine control unit 76 is a positive value. On the other hand, the switching element driving circuit 72 outputs the PWM pulse signal from the backward direction output terminal 72r when the current designating signal Ic supplied by the engine control unit 76 is a negative value.

Accordingly, when the current designating signal having a positive value is supplied by the engine control unit 76, the forward direction switching elements 70a and 70c are turned on at a duty ratio corresponding to the value of the current designating signal Ic. When the current designating signal having a negative value is supplied by the engine control unit 76, the backward direction switching elements 70a and 70c are turned on at a duty ratio corresponding the value of the current designating signal Ic. The forward switching elements 70a and 70c and the backward switching elements 70b and 70d are not turned on at the same time.

Figure 9:
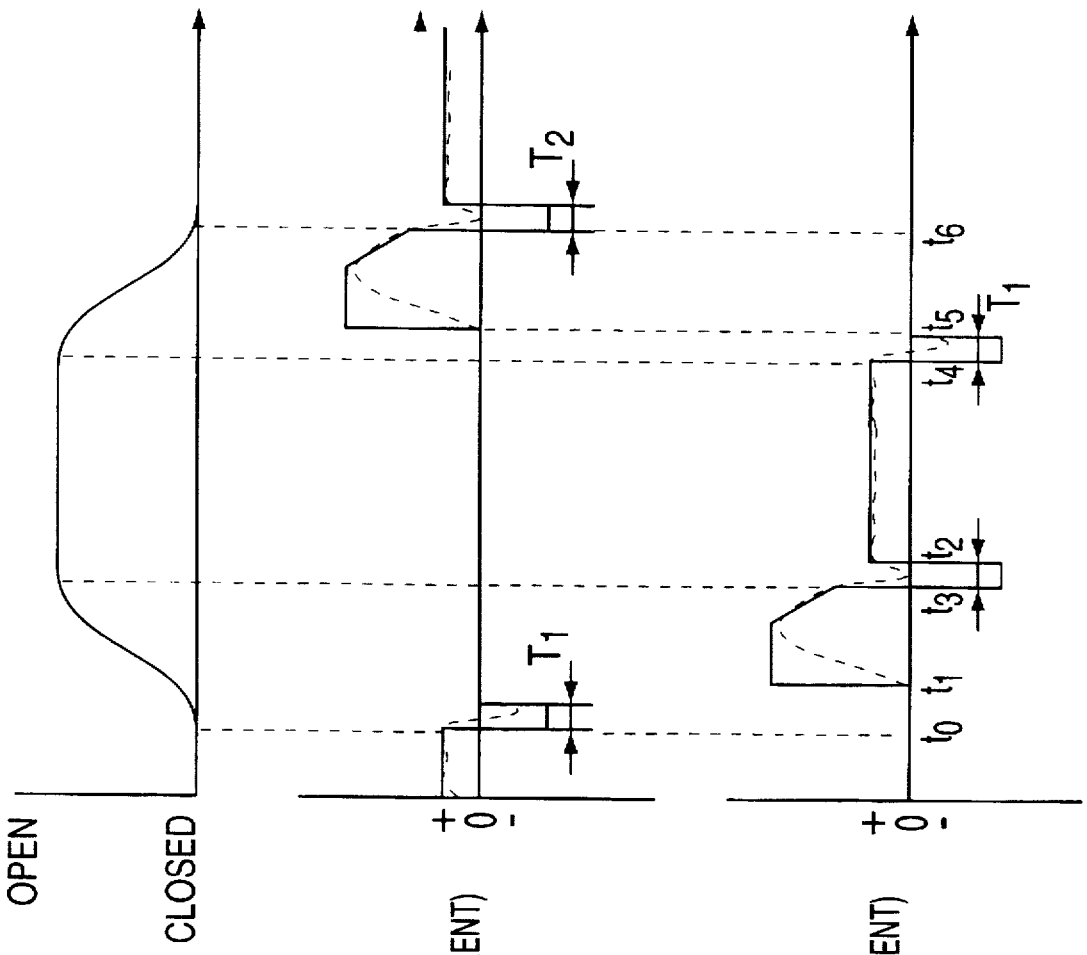
FIG. 9 is a time chart for explaining an operation of the drive circuit shown in FIG. 8.

A description will now be given, with reference to FIG. 9, of an operation of the driving circuit according to the present invention. FIG. 9-(A) indicates a time chart of the valve lift of the valve body 12 during one cycle from a closed state to the next closed state. FIG. 9-(B) indicates the current designating signal Ic (solid lines) and an actual current (dotted lines) flowing through the first electromagnetic coil 24. FIG. 9-(C) indicates the current designating signal Ic (solid lines) and an actual current (dotted lines) flowing through the second electromagnetic coil 26.

As indicated in FIG. 9-(A), the valve body 12 is maintained at the closed position before time t0. In order to maintain the valve body 12 at the closed position, a large electromagnetic force is not needed. Thus, the current designating signal having a relatively small value is supplied as shown in FIG. 9-(B). This current designating signal Ic is converted to the PWM pulse signal by the switching element driving circuit 72. The PWM pulse signal is supplied to the base terminal of each of the forward switching elements 70a and 70c via the forward direction output terminal 72f.

As a result, each of the forward switching elements 70a and 70c is turned on at the duty ratio corresponding to the current designating signal Ic. Thus, a forward direction current flows from the inflow terminal 24a to the outflow terminal 24b in the first electromagnetic coil 24. When the value of the current designating signal Ic is constant, the current flowing in the first electromagnetic coil 24 is stable, and the value thereof is equal to the value of the current designating signal Ic.

When the crank angle of the associated engine reaches a predetermined degree at time t0 at which movement of the valve body 12 must be started, the value of the current designating signal changes from a positive value to a negative value. As a result, the PWM pulse signal is output from the backward direction output terminal 72r of the switching element driving circuit 72, and is supplied to the base terminal of each of the backward switching elements 70b and 70d. Accordingly, each of the backward switching elements 70b and 70d is turned on at the duty ratio corresponding to the current designating signal Ic. Thus, a voltage is supplied between the terminals 24a and 24b so that a backward direction current flows from the outflow terminal 24b to the inflow terminal 24a in the first electromagnetic coil 24.

In the present embodiment, a negative value of the current designating signal is determined so that the voltage causing the backward direction current rapidly cancels a reverse electromotive force generating in the first electromagnetic coil 24. Accordingly, the current designating signal having a negative value is output after the time t0, the actual current flowing in the first electromagnetic coil 24 is rapidly canceled as indicated by the dotted line in FIG. 9-(B). As a result, the electromagnetic force moving the plunger 22 toward the closed position is rapidly deceased after time t0. Thus, the valve body 12 starts to move toward the open position after time t0 with a reduced power consumption at a rapid response.

As indicated in FIG. 9-(C), the current designating signal Ic rises at time t1 after a predetermined time period has elapsed since time t0. After that, until a time t3 is reached, the current designating signal Ic is supplied to the second electromagnetic coil 26 according to a predetermined current flow profile as shown in FIG. 9-(C). Thus, the valve body 12 smoothly moves from the closed position to the open position as shown in FIG. 9-(A).

The engine control unit 76 changes the value of the current designating signal Ic from a positive value to a negative value at a predetermined time t3. At time t3, the valve body 12 is close to the open position. When the value of the current designating signal Ic is thusly changed, a voltage is supplied between the terminals of the second electromagnetic coil 26 by the driving circuit for the second electromagnetic coil 26 so that a current flows from the outflow terminal to the inflow terminal of the second electromagnetic coil 26.

As a result, as indicated by the dotted line in FIG. 9-(C), the actual current flowing in the second electromagnetic coil 26 is rapidly decreased. Thus, the valve body 12 gently moves to the open position. After a predetermined time period T2 has elapsed from time t3, the value of the current designating signal Ic for the second electromagnetic coil 26 is increased to a positive value to maintain the valve body at the open position.

Thereafter, when the crank angle of the associated engine reaches a predetermined degree at a time t4 at which the valve body must be moved from the open position to the closed position, the value of the current designating signal Ic supplied to the second electromagnetic coil 26 is changed from a positive value to a negative value for a predetermined time period T1. After that, the current designating signal is controlled during a period from time t5 to time t6 according to a predetermined current flow profile as indicated by the solid lines in FIG. 9-(B). When the valve body 12 reaches a position close to the closed position at time t6, the value of the current designating signal Ic supplied to the first electromagnetic coil 24 is changed to a negative value for the predetermined time period T2. As a result, in the present embodiment, a rapid response of the valve body 12 moving from one of the closed and open positions to the other is achieved. Additionally, power consumption of the electromagnetic coils is reduced, and a quiet operation of the valve body 12, especially when the valve body 12 moves to the open position and the closed position, is achieved.

In the present embodiment, the reverse electromotive force generated in the electromagnetic coils can be canceled without a current flow to the flywheel circuit. Accordingly, the driving circuit according to the present invention can rapidly cancel the reverse electromotive force without heat being generated by a resistance of the flywheel circuit as in the previously discussed first to third embodiments.

Figure 10:
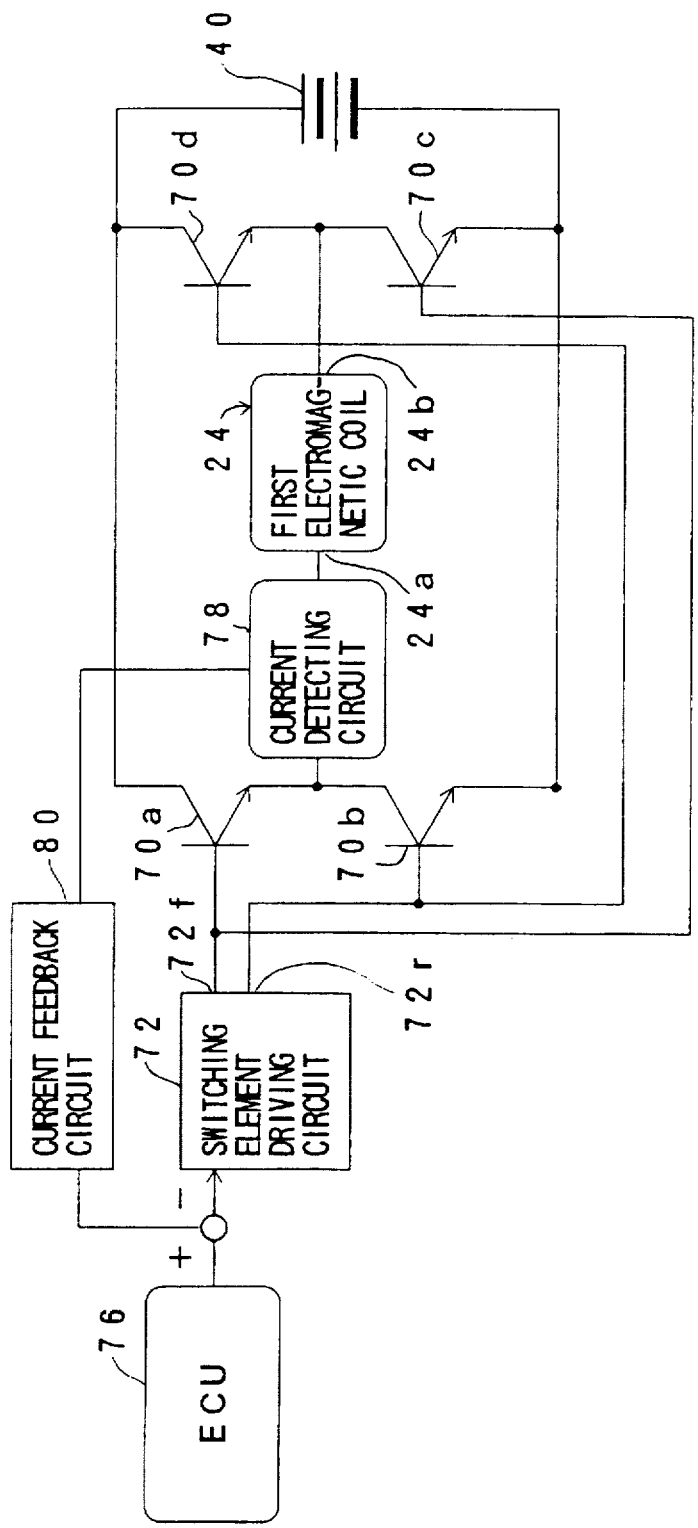
FIG. 10 is a circuit diagram of a fifth embodiment of a valve drive apparatus according to the present invention.

FIG. 10 is a circuit diagram of a drive circuit according to a fifth embodiment of the present invention. In FIG. 10, parts that are the same as the parts shown in FIG. 8 are given the same reference numerals, and descriptions thereof will be omitted.

The drive circuit shown in FIG. 10 comprises a current detecting circuit 78 which detects an actual current Im flowing in the first electromagnetic coil 24. An output signal from the current detecting circuit 78 is supplied to a current feedback circuit 80. The current feedback circuit 80 is provided for feedback of a value of the actual current Im to the output signal of the first switching element driving circuit 72. More specifically, the switching element driving circuit 72 is supplied with a difference (Ic–Im) between the current designating signal supplied by the engine control unit 76 and the actual current Im detected by the current detecting circuit 78. The switching element driving circuit 72 determines one of the terminals from which the PWM pulse signal is output in accordance with the value of the current designating signal whether it is a positive value or a negative value. Additionally, the switching element driving circuit 72 controls the duty ratio of the PWM pulse signal so that the difference (Ic–Im) is zero.

According to the present embodiment, the actual current Im flowing in the first electromagnetic coil 24 can be very accurately equalized to the current designating value. Thus, a stable and desired characteristic of the driving circuit can be obtained in a wide operational condition range of the associated engine even when the power source voltage Vb or the circuit characteristics is fluctuated.

Figure 11:
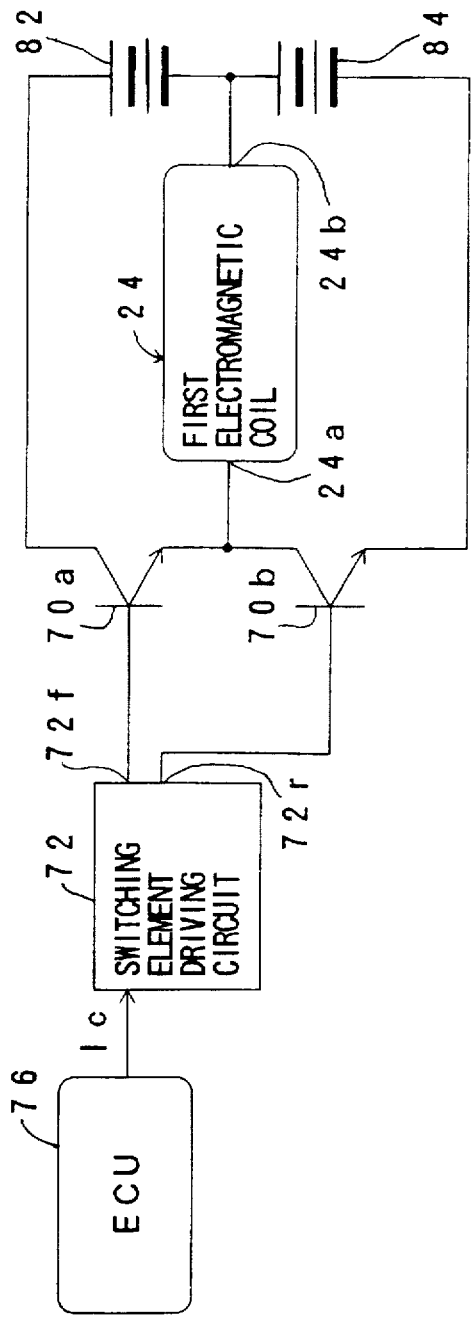
FIG. 11 is a circuit diagram of a sixth embodiment of a valve drive apparatus according to the present invention.

FIG. 11 is a circuit diagram of a drive circuit according to a sixth embodiment of the present invention. In FIG. 11, parts that are the same as the parts shown in FIG. 8 are given the same reference numerals, and descriptions thereof will be omitted.

The drive circuit shown in FIG. 11 comprises power sources 82 and 84. A positive terminal of the power source 82 is connected to the collector terminal of the forward direction switching element 70a. A negative terminal of the power source 82 is connected to the outflow terminal of the first electromagnetic coil 24. A negative terminal of the power source 84 is connected to the emitter terminal of the backward direction switching element 70a. A positive terminal of the power source 82 is connected to the outflow terminal of the first electromagnetic coil 24.

In the present embodiment, when the PWM pulse signal is output from the forward direction terminal 72f of the switching element driving circuit 72, the forward direction switching element 72a is turned on at a predetermined duty ratio. Thus, the forward direction current is supplied to the first electromagnetic coil 24 by the power source 82. On the other hand, when the PWM pulse signal is output from the backward direction terminal 72r of the switching element driving circuit 72, the backward direction switching element 72b is turned on at a predetermined duty ratio. Thus, the backward direction current is supplied to the first electromagnetic coil 24 by the power source 84. According to the present embodiment, similar to the drive circuit shown in FIG. 8, the electromotive force generated in the first coil 24 can be rapidly canceled without generating energy loss due to resistance.

Figure 12:
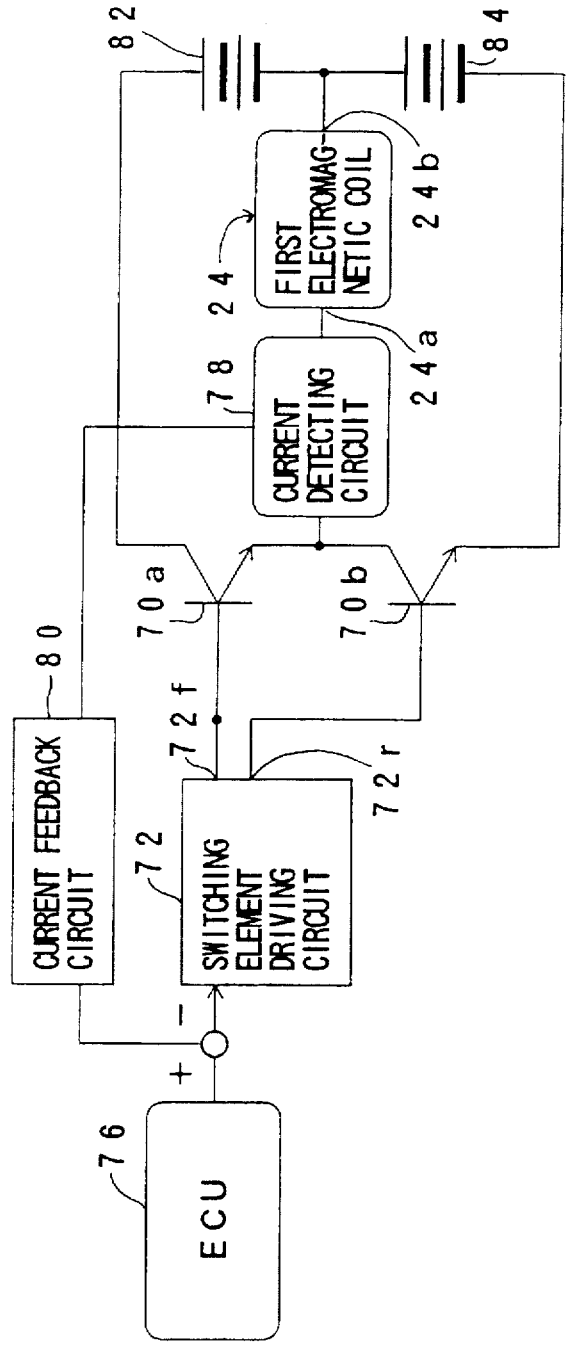
FIG. 12 is a circuit diagram of a seventh embodiment of a valve drive apparatus according to the present invention.

FIG. 12 is a circuit diagram of a drive circuit according to a seventh embodiment of the present invention. In FIG. 12, parts that are the same as the parts shown in FIG. 11 and 12 are given the same reference numerals, and descriptions thereof will be omitted.

In the drive circuit shown in FIG. 12, a feedback function of the actual current Im flowing in the first electromagnetic coil 24 is added to the drive circuit shown in FIG. 11. That is, in the drive circuit shown in FIG. 12, the current detecting circuit 78 is connected to the inflow terminal 24a of the first electromagnetic coil 24. The switching element driving circuit 72 is supplied with the difference (Ic–Im) between the current designating signal Ic supplied by the engine control unit 76 and the actual current detected by the current detecting circuit 78.

In the present embodiment, similar to the drive circuit shown in FIG. 10, the electromotive force generated in the first coil 24 can be rapidly canceled without generating energy loss due to resistance. Additionally, the value of the actual current Im flowing in the first electromagnetic coil 24 is accurately equalized to the value of the current designating signal.

Figure 13:
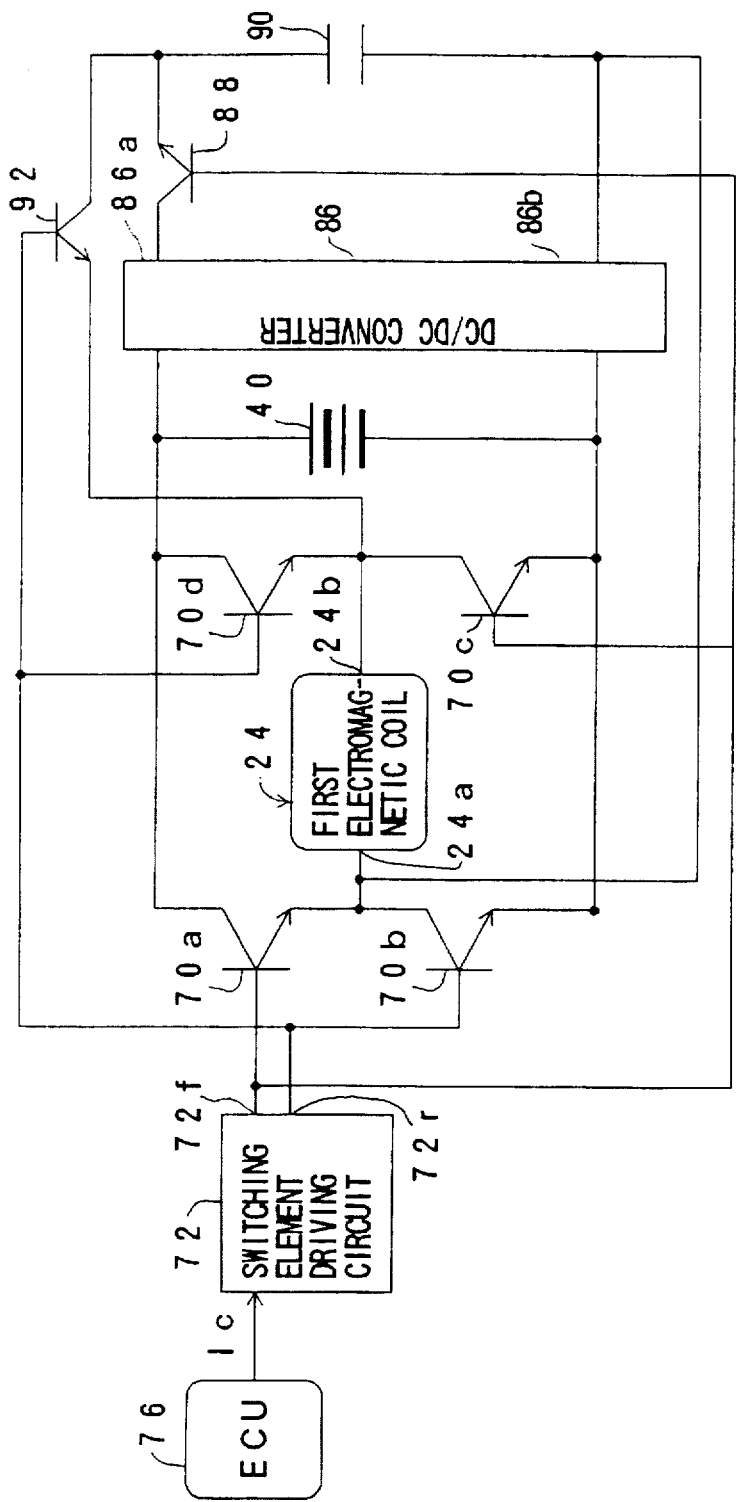
FIG. 13 is a circuit diagram of a eighth embodiment of a valve drive apparatus according to the present invention.

FIG. 13 is a circuit diagram of a drive circuit according to an eighth embodiment of the present invention. In FIG. 13, parts that are the same as the parts shown in FIG. 8 are given the same reference numerals, and descriptions thereof will be omitted.

The drive circuit shown in FIG. 13 comprises a DC/DC converter 86 connected to a positive terminal and a negative terminal of a power source 40. The DC/DC converter 86 generates a predetermined voltage higher than the voltage generated by the power source 40 between output terminals 86a and 86b. The output terminal 86a is connected to a collector terminal of a charge switching element 88 which is comprised of an NPN-type transistor. An emitter terminal of the charge switching element 88 is connected to a capacitor 90 and a collector terminal of a discharge switching element 92 which is comprised of an NPN-type transistor. A base terminal of the charge switching element 88 is connected to the forward direction output terminal 72f of the switching element driving circuit 72.

One terminal of the capacitor 90 is connected, as mentioned above, to the charge switching element 88, and the other terminal of the capacitor 90 is connected to a grounded terminal 86b of the DC/DC converter 86. Accordingly, when the charge switching element 88 is turned on, the capacitor 90 is charged by the output voltage from the DC/DC converter 86.

A base terminal of the discharge switching element 92 is connected to a backward direction output terminal 72r of the switching element driving circuit 72. Additionally, an emitter terminal of the discharge switching element 92 is connected to the outflow terminal 24b of the first electromagnetic coil 24. The inflow terminal 24a of the first electromagnetic coil 24 is connected to the grounded terminal of the capacitor 90. Accordingly, when the discharge switching element 92 is turned on, a current flows in the first electromagnetic coil from the outflow terminal to the inflow terminal due to the discharge of the capacitor 90.

In the present embodiment, when the PWM pulse signal is supplied from the forward direction output terminal 72f of the switching element driving circuit 72, the forward direction switching elements 70a and 70c are turned on at a predetermined duty ratio. At the same time the charge switching element 88 is also turned on at the predetermined duty ratio. Accordingly, a forward direction current flows in the first electromagnetic coil 24 and the capacitor 90 is charged by the DC/DC converter 86 at the same time while the PWM pulse signal is output from the forward direction output terminal 72f of the switching element driving circuit 72.

On the other hand, when the PWM pulse signal is supplied from the backward direction output terminal 72r of the switching element driving circuit 72, the backward direction switching elements 70b and 70d are turned on at a predetermined duty ratio. At the same time the discharge switching element 92 is also turned on at the predetermined duty ratio. Accordingly, a backward direction current flows in the first electromagnetic coil 24 due to discharging of the capacitor 90. When the output terminal is switched from the forward direction output terminal 72f to the backward direction output terminal 72r, a high-voltage (a backward voltage) is supplied between the terminals of the first electromagnetic coil 24 which causes a backward direction current flowing in the first electromagnetic coil 24. Thereafter, when the discharge of the capacitor 90 is completed, the voltage from the power source 40 is supplied to the terminals of the first electromagnetic coil 24 so that a current flows in the first electromagnetic coil 24 from outflow terminal 24b to the inflow terminal 24a.

According to the present invention, the reverse electromotive force generated in the first electromagnetic coil 24 can be rapidly canceled by supplying the backward voltage to the first electromagnetic coil 24. That is, the electromagnetic force generated by the electromagnetic coil 24 can be rapidly canceled. At this time, the electromagnetic force can be decreased faster as a higher level backward voltage is supplied to the first electromagnetic coil 24.

Figure 14:
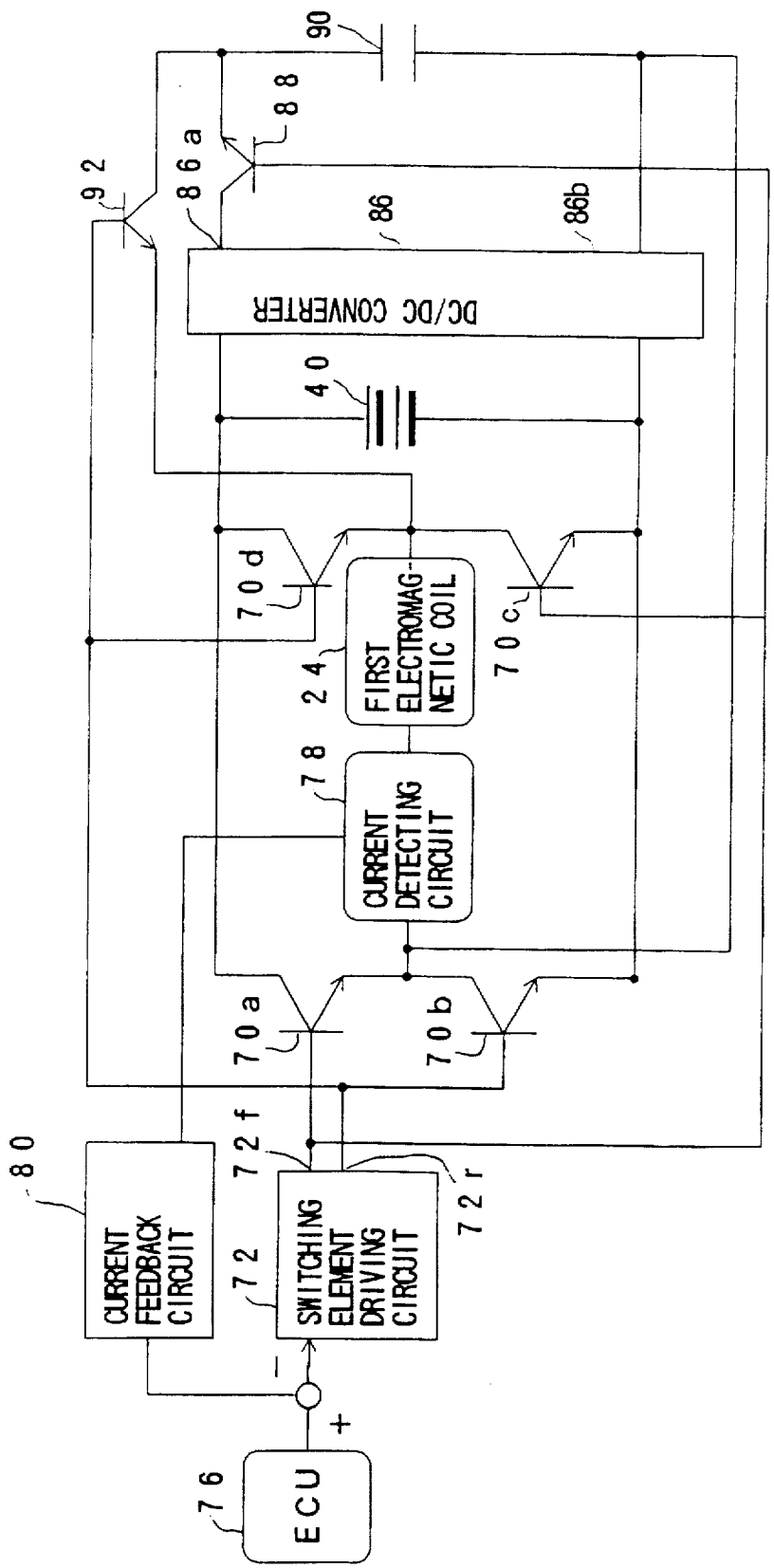
FIG. 14 is a circuit diagram of a ninth embodiment of a valve drive apparatus according to the present invention.

FIG. 14 is a circuit diagram of a drive circuit according to a ninth embodiment of the present invention. In FIG. 14, parts that are the same as the parts shown in FIGS. 10 and 13 are given the same reference numerals, and descriptions thereof will be omitted.

The drive circuit shown in FIG. 14 is a combination of the drive circuit shown in FIG. 10 and the drive circuit shown in FIG. 13. That is, the current detecting circuit 78 and the current feedback circuit 80 are added to the drive circuit shown in FIG. 13. Accordingly, in this embodiment, the electromagnetic force generated by the first electromagnetic coil 24 can be rapidly decreased while the value of the actual current Im flowing in the first electromagnetic coil 24 is accurately equalized to the value of the current designating signal Ic.

Figure 15:
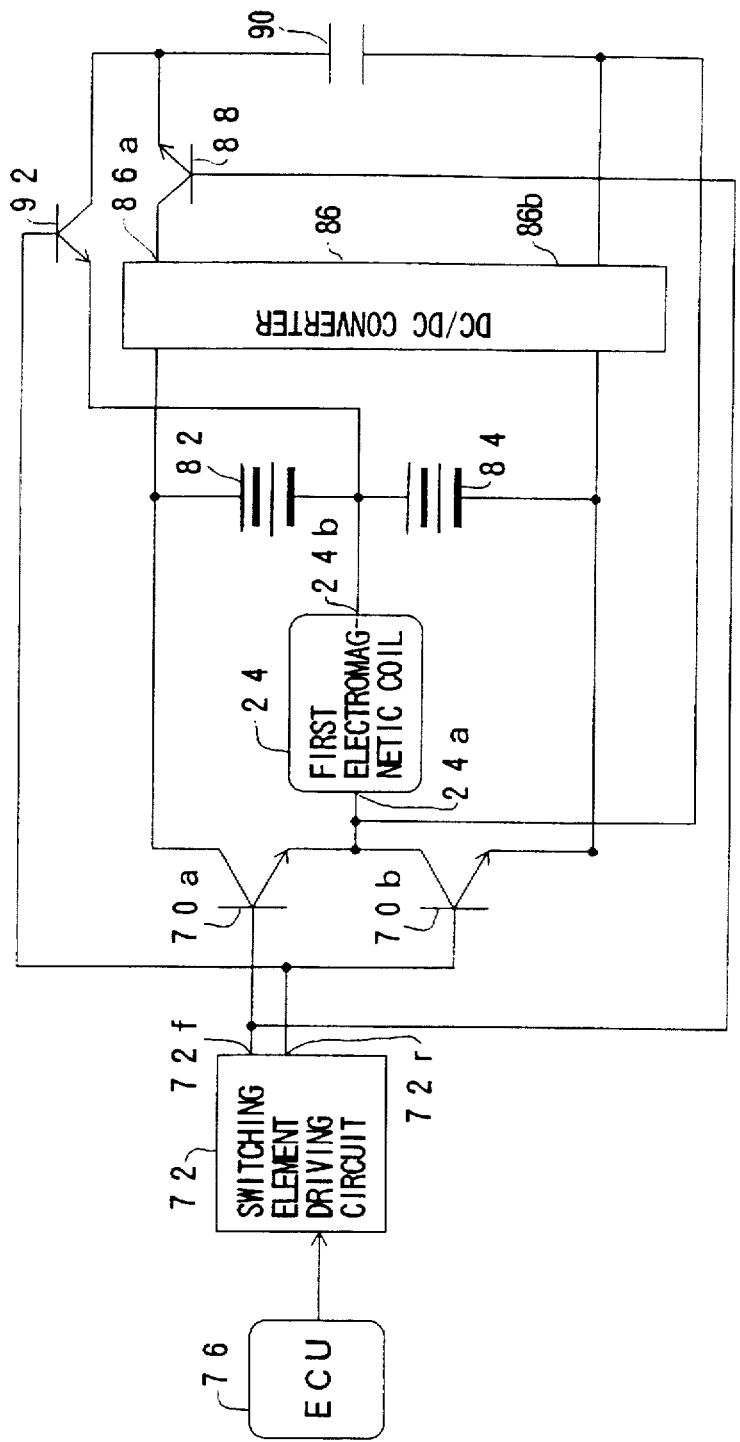
FIG. 15 is a circuit diagram of a tenth embodiment of a valve drive apparatus according to the present invention.

FIG. 15 is a circuit diagram of a drive circuit according to a tenth embodiment of the present invention. In FIG. 15, parts that are the same as the parts shown in FIGS. 11 and 13 are given the same reference numerals, and descriptions thereof will be omitted.

The drive circuit shown in FIG. 15 is a combination of the drive circuit shown in FIG. 11 and the driving circuit shown in FIG. 13. That is, the DC/DC converter 86, the charge switching element 88, the capacitor 90 and the discharge switching element 92 shown in FIG. 13 are added to the drive circuit shown in FIG. 11. According to the present embodiment, A voltage generated between the positive terminal of the power source 82 and the negative terminal of the power source 84 is increased by the DC/DC converter 86. The increased voltage is supplied to the capacitor 90 so as to charge the capacitor 90. Discharging of the capacitor 90 controlled by the charge switching element 88 and discharge switching element 92 is as previously discussed. Thus, the capacitor 90 is charged when the PWM pulse signal is output from the forward direction output terminal of the switching element driving circuit 72. The discharging of the capacitor 90 is performed immediately after the output of the PWM pulse signal is switched from the forward direction output terminal 72f to the backward direction output terminal 72r.

According to the present embodiment, the backward voltage supplied to the first electromagnetic coil 24 can be at a higher-level than the voltage generated by the power source. Thus, the present embodiment has the same advantage as that of the drive circuit shown in FIG. 13.

FIG. 16 is a circuit diagram of a drive circuit according to a eleventh embodiment of the present invention. In FIG. 16, parts that are the same as the parts shown in FIGS. 10 and 15 are given the same reference numerals, and descriptions thereof will be omitted.

The drive circuit shown in FIG. 16 is a combination of the drive circuit shown in FIG. 10 and the drive circuit shown in FIG. 15. That is, the current detecting circuit 78 and the current feedback circuit 80 are added to the drive circuit shown in FIG. 15. Accordingly, in this embodiment, the electromagnetic force generated by the first electromagnetic coil 24 can be rapidly decreased while the value of the actual current Im flowing in the first electromagnetic coil 24 is accurately equalized to the value of the current designating signal Ic.

In the above discussed embodiments, the electric power supplied to the electromagnetic coil is controlled by using the forward direction switching elements 70a and 70c and the backward direction switching elements 70b and 70d. However, those switching elements may be replaced by relays having a rapid response. Additionally, the control of the electric power may be achieved by utilizing a linear region of the each of the switching elements instead of the PWM control.

It should be noted that, in the drive circuits shown in FIGS. 8 and 10–12, the forward direction switching elements 70a and 70c and power source 40 together constitute first voltage supplying means. The backward switching elements 70b and 70d and the power source 40 together constitute second voltage supplying means.

Additionally, in the drive circuits shown FIGS. 13–16, the forward switching elements 70a and 70c constitute first supplying means. The backward switching elements 70b and 70d, the DC/DC converter 86, the charge switching element 88, the capacitor 90 and the discharge switching element 92 together constitute second voltage supplying means. The DC/DC converter 86 constitutes voltage increasing means.

The present invention is not limited to the specifically disclosed embodiments, and variations and modifications may be made without departing from the scope of the present invention.

What is claimed is:

1. A valve driving apparatus for driving a valve provided in an internal combustion engine, said valve having a valve body movable between a first position and a second position so as to open and close said valve, said valve driving apparatus comprising:

an electromagnetic coil generating an electromagnetic force exerted on said valve body;

current controlling means for controlling a current supplied to said electromagnetic coil in accordance with an operational condition of said internal combustion engine; and current decreasing means for decreasing said current when said valve body approaches one of said first position and said second position, said current decreasing means including a flywheel circuit and a variable resistor for increasing a resistance of said flywheel circuit when said valve body approaches one of said first position and said second position.

2. The valve driving apparatus as claimed in claim 1, wherein said flywheel circuit returns a current flowing in said electromagnetic coil.

3. The valve driving apparatus as claimed in claim 1, wherein said current controlling means comprises:

a main switching element varying the current provided to said electromagnetic coil; and a main switching element driving circuit driving said main switching element by supplying a first control signal to said main switching element, said first control signal being generated in accordance with a current designating signal supplied by an engine control unit provided in said internal combustion engine, said main switching element varying the current supplied to said electromagnetic coil in accordance with said first control signal supplied by said main switching element driving circuit.

4. The valve driving apparatus as claimed in claim 3, wherein said first control signal comprises a pulsed voltage signal and said main switching element varies the current supplied to said electromagnetic coil by pulse width modulation.

5. The valve driving apparatus as claimed in claim 3, further comprising current detecting means for detecting the current provided to said electromagnetic coil so as to generate a current detection signal, said variable resistor circuit varying the resistance of said flywheel circuit in accordance with a difference between a value of said current designating signal supplied by said engine control unit and a value of said current detection signal supplied by said current detecting means.

6. The valve driving apparatus as claimed in claim 5, wherein said variable resistor circuit comprises a secondary switching element and a secondary switching element driving circuit, said secondary switching element substantially varying the resistance of said variable resistor circuit, said secondary switching element driving circuit driving said secondary switching element.

7. The valve driving apparatus as claimed in claim 6, further comprising a determining circuit for determining one of the difference being greater than a first predetermined value and the difference being smaller than a second predetermined value which is less than one of said first predetermined value and the difference between said first predetermined value and said second predetermined value, said determining circuit outputting a second control signal to said secondary switching element driving circuit a value of said second control signal being varied in accordance with a determination of said determining circuit.

8. The valve driving apparatus as claimed in claim 7, wherein said determining circuit comprises a triangular waveform oscillating circuit generating a triangular waveform signal having a maximum value corresponding to said first predetermined value and a minimum value corresponding to said second predetermined value, the determination of said determining circuit being performed by comparing said difference with a value of said triangular waveform signal.

9. The valve driving apparatus as claimed in claim 1, wherein said current controlling means comprises first voltage supplying means for supplying a first voltage to said electromagnetic coil so that a first current flows in said electromagnetic coil in a first direction, and said current decreasing means comprises second voltage supplying means for supplying a second voltage to said electromagnetic coil when said valve body approaches one of said first position and said second position, said second voltage being supplied so that a second current flows in said electromagnetic coil in a second direction opposite to said first direction.

10. The valve driving apparatus as claimed in claim 9, further comprising a current detecting circuit detecting the current flowing to said electromagnetic coil and current feedback circuit for supplying said current detection signal to said current controlling means.

11. The valve driving apparatus as claimed in claim 9, further comprising switching means for switching connection of said electromagnetic coil from one of said first voltage supplying means and said second voltage supplying means to the other one of said first and second voltage supplying means.

12. The valve driving apparatus as claimed in claim 9, wherein said second voltage supplying means comprises a capacitor and voltage increasing means for increasing a third voltage supplied to said capacitor, said capacitor connected to said electromagnetic coil so that said second voltage is temporarily increased by a discharge of said capacitor when said second voltage is supplied to said electromagnetic coil.

13. The valve driving apparatus as claimed in claim 12, wherein said capacitor is charged by said third voltage when said first voltage is supplied to said electromagnetic coil.

14. The valve driving apparatus as claimed in claim 9, wherein said first voltage supplying means comprises a first circuit having a first switching element, second switching element and a direct current power source connected in series, said electromagnetic coil being connected between said first switching element and said second switching element so that a current flows to said electromagnetic coil in a first direction, said second voltage supplying means comprises a second circuit having a third switching element, a fourth switching element and said direct current power source connected in series, said electromagnetic coil being connected between said third switching element and said fourth switching element so that a current flows to said electromagnetic coil in a second direction opposite to said first direction.

15. The valve driving element as claimed in claim 9, wherein said first voltage supplying means comprises a first circuit having a first switching element and a first direct current power source, said electromagnetic coil being connected between said first switching element and said first direct current power source so that a current flows in said electromagnetic coil in a first direction, and said second voltage supplying means comprises a second circuit having a second switching element and a second direct current power source, said electromagnetic coil being connected between said second switching element and said second direct current power source so that a current flows in said electromagnetic coil in a second direction opposite to said first direction.

* * * * *